United States Patent
Feng

(10) Patent No.: US 9,633,252 B2
(45) Date of Patent: Apr. 25, 2017

(54) REAL-TIME DETECTION OF USER INTENTION BASED ON KINEMATICS ANALYSIS OF MOVEMENT-ORIENTED BIOMETRIC DATA

(71) Applicant: LENOVO (Singapore) PTE, LTD., New Tech Park (SG)

(72) Inventor: Xin Feng, Arcadia, CA (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 450 days.

(21) Appl. No.: 14/137,472

(22) Filed: Dec. 20, 2013

(65) Prior Publication Data

US 2015/0178555 A1 Jun. 25, 2015

(51) Int. Cl.
*G06K 9/00* (2006.01)
*G06F 3/01* (2006.01)

(52) U.S. Cl.
CPC ......... *G06K 9/00335* (2013.01); *G06F 3/013* (2013.01); *G06F 3/017* (2013.01); *G06K 9/00617* (2013.01); *G06K 9/00355* (2013.01)

(58) Field of Classification Search
None
See application file for complete search history.

(56) References Cited

U.S. PATENT DOCUMENTS

| | | |
|---|---|---|
| 2,510,344 A | 6/1950 | Law |
| 2,567,654 A | 9/1951 | Siezen |
| 3,418,426 A | 12/1968 | Schlegal et al. |
| 3,628,854 A | 12/1971 | Jampolsky |
| 4,082,433 A | 4/1978 | Appeldorn et al. |
| 4,190,330 A | 2/1980 | Berreman |
| 4,577,928 A | 3/1986 | Brown |
| 5,579,037 A | 11/1996 | Tahara et al. |
| 5,583,702 A | 12/1996 | Cintra |
| 5,583,795 A | 12/1996 | Smyth |
| 5,649,061 A | 7/1997 | Smyth |
| 5,731,805 A | 3/1998 | Tognazzini et al. |
| 5,831,594 A | 11/1998 | Tognazzini et al. |
| 5,886,683 A | 3/1999 | Tognazzini et al. |
| 5,898,423 A | 4/1999 | Tognazzini et al. |
| 6,046,847 A | 4/2000 | Takahashi |
| 6,120,461 A | 9/2000 | Smyth |

(Continued)

FOREIGN PATENT DOCUMENTS

| | | |
|---|---|---|
| DE | 10310794 | 9/2004 |
| DE | 69937592 | 10/2008 |

(Continued)

OTHER PUBLICATIONS

U.S. Appl. No. 14/132,663, Office Action Summary, Jan. 13, 2016.

(Continued)

*Primary Examiner* — Atiba O Fitzpatrick
(74) *Attorney, Agent, or Firm* — Kunzler Law Group

(57) ABSTRACT

An apparatus for real-time detection of user intention based on kinematic analysis of movement-oriented biometric data includes a biometric data module that receives movement-oriented biometric data, a movement module that identifies an acceleration value using the movement-oriented biometric data, and an evaluation module that interprets a user intention based at least in part on the acceleration value.

20 Claims, 16 Drawing Sheets

(56) References Cited

U.S. PATENT DOCUMENTS

| | | |
|---|---|---|
| 6,437,758 B1 | 8/2002 | Nielsen et al. |
| 6,467,905 B1 | 10/2002 | Stahl et al. |
| 6,577,329 B1 | 6/2003 | Flickner |
| 6,873,314 B1 | 3/2005 | Campbell |
| 8,160,311 B1 | 4/2012 | Schaefer |
| 8,493,390 B2 | 7/2013 | Kalinli |
| 8,594,374 B1 | 11/2013 | Bozarth |
| 8,600,362 B1 | 12/2013 | Kim |
| 8,767,014 B2 | 7/2014 | Vaught et al. |
| 8,824,779 B1 | 9/2014 | Smyth |
| 8,885,882 B1 | 11/2014 | Yin et al. |
| 8,893,164 B1 | 11/2014 | Teller |
| 8,922,480 B1 | 12/2014 | Freed et al. |
| 8,941,476 B2 | 1/2015 | Hill |
| 8,957,847 B1 | 2/2015 | Karakotsios et al. |
| 9,035,874 B1 | 5/2015 | Fowers et al. |
| 9,096,920 B1 | 8/2015 | Gomez et al. |
| 9,152,221 B2 | 10/2015 | Denker et al. |
| 2001/0030711 A1 | 10/2001 | Saito |
| 2002/0077169 A1 | 6/2002 | Kelly et al. |
| 2003/0146901 A1 | 8/2003 | Ryan |
| 2004/0100567 A1 | 5/2004 | Miller et al. |
| 2004/0103111 A1 | 5/2004 | Miller et al. |
| 2004/0160419 A1 | 8/2004 | Padgitt |
| 2004/0183749 A1 | 9/2004 | Vertegaal |
| 2005/0086610 A1 | 4/2005 | Mackinlay et al. |
| 2005/0243054 A1 | 11/2005 | Beymer et al. |
| 2006/0093998 A1 | 5/2006 | Vertegaal |
| 2006/0109237 A1 | 5/2006 | Morita et al. |
| 2006/0109238 A1 | 5/2006 | Lau et al. |
| 2006/0110008 A1 | 5/2006 | Vertegaal et al. |
| 2006/0139318 A1 | 6/2006 | Kariathungal et al. |
| 2006/0139319 A1 | 6/2006 | Kariathungal et al. |
| 2006/0256083 A1 | 11/2006 | Rosenberg |
| 2006/0256133 A1 | 11/2006 | Rosenberg |
| 2007/0078552 A1 | 4/2007 | Rosenberg |
| 2007/0164990 A1 | 7/2007 | Bjorklund et al. |
| 2008/0227538 A1 | 9/2008 | Kelly et al. |
| 2008/0266252 A1 | 10/2008 | Keates et al. |
| 2009/0065578 A1 | 3/2009 | Peterson et al. |
| 2009/0097705 A1 | 4/2009 | Thorn |
| 2009/0146775 A1 | 6/2009 | Bonnaud et al. |
| 2009/0204410 A1 | 8/2009 | Mozer et al. |
| 2009/0248692 A1 | 10/2009 | Tsukagoshi et al. |
| 2009/0259349 A1 | 10/2009 | Golenski |
| 2009/0315740 A1 | 12/2009 | Hildreth et al. |
| 2010/0007601 A1 | 1/2010 | Lashina et al. |
| 2010/0045596 A1 | 2/2010 | De Leon |
| 2010/0079508 A1 | 4/2010 | Hodge et al. |
| 2010/0171720 A1 | 7/2010 | Craig et al. |
| 2010/0211918 A1 | 8/2010 | Liang et al. |
| 2010/0220897 A1 | 9/2010 | Ueno et al. |
| 2011/0007142 A1* | 1/2011 | Perez ............... G06F 3/017 348/77 |
| 2011/0065451 A1 | 3/2011 | Danado et al. |
| 2011/0175932 A1 | 7/2011 | Yu et al. |
| 2011/0213664 A1 | 9/2011 | Osterhout et al. |
| 2011/0213709 A1 | 9/2011 | Newman et al. |
| 2011/0276961 A1 | 11/2011 | Johansson et al. |
| 2012/0105486 A1 | 5/2012 | Landford et al. |
| 2012/0149309 A1 | 6/2012 | Hubner et al. |
| 2012/0169582 A1 | 7/2012 | Tschirhart |
| 2012/0200490 A1 | 8/2012 | Inada |
| 2012/0220311 A1 | 8/2012 | Rodriguez et al. |
| 2012/0256967 A1 | 10/2012 | Baldwin et al. |
| 2012/0268268 A1 | 10/2012 | Bargero |
| 2012/0272179 A1 | 10/2012 | Stafford |
| 2013/0012305 A1 | 1/2013 | Kelly et al. |
| 2013/0014052 A1 | 1/2013 | Frey et al. |
| 2013/0021459 A1 | 1/2013 | Vasilieff et al. |
| 2013/0027302 A1 | 1/2013 | Iwaizumi et al. |
| 2013/0044042 A1 | 2/2013 | Olsson et al. |
| 2013/0054622 A1* | 2/2013 | Karmarkar ......... G06F 17/30032 707/749 |
| 2013/0057573 A1 | 3/2013 | Chakravarthula et al. |
| 2013/0128364 A1 | 5/2013 | Wheeler et al. |
| 2013/0135196 A1 | 5/2013 | Park et al. |
| 2013/0169754 A1 | 7/2013 | Aronsson et al. |
| 2013/0170755 A1 | 7/2013 | Dalton et al. |
| 2013/0176208 A1 | 7/2013 | Tanaka et al. |
| 2013/0198056 A1 | 8/2013 | Aldrey et al. |
| 2013/0201305 A1 | 8/2013 | Sibecas et al. |
| 2013/0208014 A1 | 8/2013 | Fleck et al. |
| 2013/0246663 A1 | 9/2013 | Raveendran et al. |
| 2013/0254716 A1 | 9/2013 | Mishra |
| 2013/0260360 A1 | 10/2013 | Baurmann et al. |
| 2013/0307771 A1 | 11/2013 | Parker et al. |
| 2013/0321265 A1 | 12/2013 | Bychkov et al. |
| 2013/0340005 A1 | 12/2013 | Kwan |
| 2013/0340006 A1 | 12/2013 | Kwan |
| 2014/0038137 A1 | 2/2014 | Hill |
| 2014/0108309 A1 | 4/2014 | Frank et al. |
| 2014/0168054 A1 | 6/2014 | Yang et al. |
| 2014/0168056 A1 | 6/2014 | Swaminathan et al. |
| 2014/0168399 A1 | 6/2014 | Plummer et al. |
| 2014/0172467 A1 | 6/2014 | He et al. |
| 2014/0176813 A1 | 6/2014 | Conness et al. |
| 2014/0204029 A1 | 7/2014 | Lopez et al. |
| 2014/0237366 A1 | 8/2014 | Poulos et al. |
| 2014/0247232 A1 | 9/2014 | George-Svahn et al. |
| 2014/0247286 A1 | 9/2014 | Chi |
| 2014/0267400 A1 | 9/2014 | Mabbutt et al. |
| 2014/0272810 A1 | 9/2014 | Fields et al. |
| 2014/0292665 A1 | 10/2014 | Lathrop et al. |
| 2014/0298257 A1* | 10/2014 | Grandhi ............... G06F 3/0484 715/808 |
| 2014/0310256 A1 | 10/2014 | Olsson et al. |
| 2014/0315531 A1 | 10/2014 | Joong et al. |
| 2014/0317524 A1 | 10/2014 | VanBlon et al. |
| 2014/0333566 A1 | 11/2014 | Lee et al. |
| 2014/0344012 A1 | 11/2014 | Kamhi et al. |
| 2014/0361971 A1 | 12/2014 | Sala |
| 2014/0364212 A1 | 12/2014 | Osman et al. |
| 2015/0042552 A1 | 2/2015 | Tsoref |
| 2015/0049012 A1 | 2/2015 | Liu et al. |
| 2015/0066980 A1 | 3/2015 | Kim |
| 2015/0070481 A1 | 3/2015 | S. et al. |
| 2015/0074602 A1 | 3/2015 | VanBlon et al. |
| 2015/0084864 A1 | 3/2015 | Geiss et al. |
| 2015/0092056 A1 | 4/2015 | Rau et al. |
| 2015/0113454 A1 | 4/2015 | McLaughlin |
| 2015/0154001 A1 | 6/2015 | Knox et al. |
| 2015/0154134 A1 | 6/2015 | Beaumont et al. |
| 2015/0154983 A1 | 6/2015 | VanBlon et al. |
| 2015/0160461 A1 | 6/2015 | Starner et al. |
| 2015/0169048 A1 | 6/2015 | Peterson et al. |
| 2015/0177830 A1 | 6/2015 | Feng et al. |
| 2015/0205350 A1 | 7/2015 | VanBlon et al. |
| 2015/0205577 A1 | 7/2015 | VanBlon et al. |
| 2016/0041406 A1 | 2/2016 | Flores et al. |
| 2016/0147297 A1 | 5/2016 | Rose et al. |
| 2016/0148342 A1 | 5/2016 | Waltermann et al. |
| 2016/0154555 A1 | 6/2016 | Perrin et al. |

FOREIGN PATENT DOCUMENTS

| | | |
|---|---|---|
| EP | 0880090 | 11/1998 |
| JP | 08278134 | 10/1996 |
| JP | 1091378 | 4/1998 |
| JP | 11110120 | 4/1999 |
| WO | 2004051392 | 6/2004 |

OTHER PUBLICATIONS

U.S. Appl. No. 14/137,451, Office Action Summary, May 13, 2015.

U.S. Appl. No. 14/132,663, Office Action Summary, Sep. 22, 2015.

Qvarfort, et al., "Conversing with the User Based on Eye-Gaze Patterns", CHI 2005, Proceeding of the SIGCHI Conference on Human Factors in Computer Systems, ACM, Apr. 2-7, 2005, pp. 221-230.

Jacob, et al., "Eye Tracking in Human-Computer Interaction and Usability Research: Ready to Deliver the Promises", The Mind's

(56) References Cited

OTHER PUBLICATIONS

Eye: Cognitive and Applied Aspects of Eye Movement Research, Hynoa, Radach & Deubel (eds.) Oxford, England, 2003.
Kern, et al., Making User of Drivers' Glance onto the Screen for Explicit Gaze-Based Interaction, Proceedings of the Second International Conference on Automotive User Interfaces and Interactive Vehicular Applications (AutomotiveUI 2010), Nov. 11-12, 2010, Pittsburgh, Pennsylvania, USA, pp. 110-113.
Beamforming, Wikipedia, Definition, https://en.wikipedia.org/wiki/Beamforming, Printed from website Jan. 22, 2015.
Electromyography, Wikipedia, Definition, https://en.wikipedia.org/wiki/Electromyography, Printed from website Jan. 27, 2015.
Extended Display Identification Data, Wikipedia, Definition, https://en.wikipedia.org/wiki/Extended_Display_Identification_Data, Printed from website Oct. 10, 2014.
Microphone, Wikipedia, Definition, https://en.wikipedia.org/wiki/Microphone, printed from website Jan. 22, 2015.
Microphone Array, Wikipedia, Definition, https://en.wikipedia.org/wiki/Microphone_array, printed from webiste Jan. 22, 2015.
MYO-Tech Specs, https://www.thalmic.com/en/myo/techspecs, printed from website Jan. 27, 2015.
Arthur Davis et al., "Optical Design using Fresnel Lenses Basic Principles and some Practical Examples", Optik & Photonik, Dec. 2007, No. 4, pp. 52-55.
Darren Quick, "PixelOptics to launch 'worlds first electronic focusing eyewear'", http://www.gizmag.com/pixeloptics-empower-electronic-focusing-glasses/17569/, Jan. 2011.
"Electronic-lens company PixelOptics is bankrupt", Insight News, http://www.insightnews.com.au/_blog/NEWS_NOW!/post/electronic-lens-company-pixeloptics-is-bankrupt/, Dec. 2013.
Polarizer, Wikipedia, Definition, https://en.wikipedia.org/wiki/Polarizer, printed from website Jan. 14, 2015.
"Raise to Speak Makes Siri Wonderfully Useful (Once You Know How to Use It)", iSource, http://isource.com/2012/10/01/raise-to-speak-makes-siri-wonderfully-useful-once-you-know-how-to=use-it/, Oct. 2012.
"Relationship Between Inches, Picas, Points, Pitch, and Twips", Article ID 76388, http://wupport2.microsoft.com/KR/76388, printed Oct. 10, 2014.
Smart glass, Wikipedia, Definition, https://en.wikipedia.org/wiki/Smart_glass, printed from website Jan. 14, 2015.
"Taking Touch Screen Interfaces Into a New Dimension", Tactus Technology White Paper, 2012, pp. 1-13.
"Understanding EDID—Extended Display Identification Data", Digital Connection, ExtroNews 20.3, 2009, Extron www.extron.com.
"Understanding & Using Directional Microphones", SOS Sound on Sound, Sep. 20000, http://www.soundonsound.com/sos/sep00/articles/direction.htm.
"See the World in Superfocus Revolutionary Eyeglasses Give You the Power to Focus Your Entire View At Any Distance", Superfocus, http://superfocus.com/eye-care-practitioners, printed from website Jun. 24, 2014.
U.S. Appl. No. 14/137,451 Office Action Summary, Oct. 21, 2015.
U.S. Appl. No. 14/548,938 Office Action Summary, Dec. 2, 2015.
U.S. Appl. No. 14/137,451, Office Action Summary, Mar. 9, 2016.
U.S. Appl. No. 14/548,938 Office Action Summary, Mar. 10, 2016.
14132663 Office Action dated Dec. 5, 2015.

\* cited by examiner

REAL-TIME DETECTION OF USER INTENTION BASED ON KINEMATICS ANALYSIS OF MOVEMENT-ORIENTED BIOMETRIC DATA

BACKGROUND

Field

The subject matter disclosed herein relates to kinematics analysis of movement-oriented biometric data and more particularly relates to methods, systems, and apparatus for real-time determination of user intention based on kinematics analysis of movement-oriented biometric data.

Description of the Related Art

User movements, such as finger swipes, eye movements, and gestures can be computationally intensive and may require high end hardware or may result in lag due to processing input.

BRIEF SUMMARY

An apparatus for real-time detection of user intention based on kinematic analysis of movement-oriented biometric data is disclosed. The apparatus for real-time detection of user intention based on kinematic analysis of movement-oriented biometric data includes a biometric data module that receives movement-oriented biometric data; a movement module that identifies an acceleration value using the movement-oriented biometric data; and an evaluation module that interprets a user intention based at least in part on the acceleration value. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
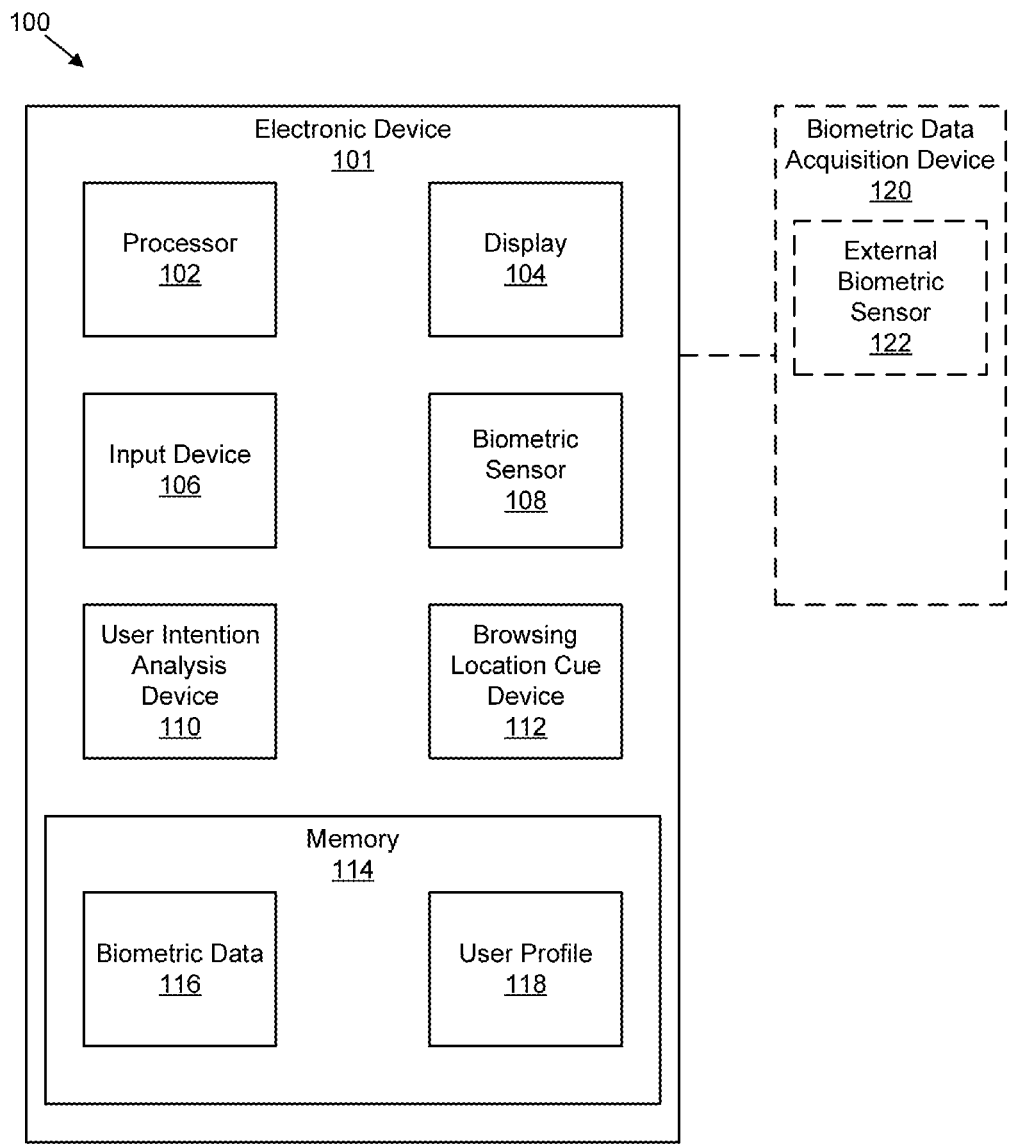
FIG. 1 is a schematic block diagram illustrating one embodiment of a system for real-time detection of user intention based on kinematics analysis of movement-oriented biometric data.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the methods, systems, apparatus, and computer program products perform real-time kinematics analysis of movement-oriented biometric data. In some embodiments, the kinematic analysis is used to interpret a user's intention. For example, the kinematics analysis may be used to interpret whether a short-range movement, such as a short edge-swipe, is intended or whether a long-range movement, such as a long edge-swipe, is intended by the user's movement.

In some embodiments, the kinematics analysis is used to interpret whether a user is paying attention to a computer interface, or whether the user has become distracted from the computer interface. The computer interface may be a display, a window, or any sub-element of a display or window. The nature of the computer interface may depend on the type of electronic device and the nature of applications being executed on the electronic device. For example, the computer interface may be a windowed browser on a laptop, desktop, or tablet computer. As another example, the computer interface may be the entire display of an electronic reader or a handheld device executing a reader application.

In some embodiments, the movement-oriented biometric data is used to determine movement and/or position values. In some embodiments, the movement and/or position values may be compared to a plurality of thresholds to interpret a user's intention. For example, where an acceleration threshold is exceeded and a jerk (also known as jolt) threshold is exceeded, a user's movement may be interpreted as a distraction movement. In some embodiments, the movement and/or position values may be compared to a plurality of profiles to interpret a user's intention. For example, where velocity values match a bell curve, a user's movement may be interpreted as a short range movement. In some embodiments, the movement and/or position values may be compared to thresholds and profiles to interpret a user's intention. For example, where velocity values match a bell curve and an acceleration value exceeds a threshold, a user's movement may be interpreted as a long-range movement. In some embodiment, an action is performed in response to determining the user's intention, the action selected based on the user's intention.

In some embodiments, the kinematics analysis is used to determine where a user is looking in relation to a computer interface. For example, the biometric data may be analyzed to determine a browsing location on a computer interface. Further analysis may determine, in real-time, when a user becomes distracted from the computer interface. After determining user distraction, a browsing location corresponding to the moment of distraction may be stored as a last browsing location. A visual cue may be provided at the last browsing location to aid the user in quickly identifying the last browsing location. For example, by highlighting words on a computer interface corresponding to the last browsing location, a user reading text on the computer interface will quickly identify the last-read words and be able to resume reading.

FIG. 1 depicts a system 100 for acquiring and analyzing movement-oriented biometric data, according to embodiments of the disclosure. The system 100 includes an electronic device 101. The electronic device 101 comprises a processor 102, a display 104, a user intention analysis device 110, a browsing location cue device 112, and a memory 114. In some embodiments, the electronic device 101 also includes an input device 106 and/or a biometric sensor 108. The components of the electronic device 101 may be interconnected by a communication fabric, such as a computer bus. In some embodiments, the electronic device 101 is communicatively coupled to a biometric data acquisition device 120. The biometric data acquisition device 120 contains an external biometric sensor 122 that acquires biometric data.

The processor 102 may comprise any known controller capable of executing computer-readable instructions and/or capable of performing logical operations on the biometric data. For example, the processor 102 may be a microcontroller, a microprocessor, a central processing unit (CPU), a graphics processing unit (GPU), an auxiliary processing unit, a FPGA, or similar programmable controller. In some embodiments, the processor 102 executes instructions stored in the memory 114 to perform the methods and routines described herein.

The display 104 may comprise any known electronic display capable of outputting visual data to a user. For example, the display 104 may be an LCD display, an LED display, an OLED display, a projector, or similar display device capable of outputting images, text, or the like to a user. The display 104 may receive image data for display from the processor 102, the user intention analysis device 110, and/or the browsing location cue device 112.

The input device 106 may comprise any known computer input device. For example, the input device 106 may be a touch panel, a button, a key, or the like. In some embodiments, the input device 106 may be integrated with the display 104, such as a touchscreen or similar touch-sensitive display. In some embodiments, movement-oriented biometric data may be generated by the input device 106. For example, biometric data relating to finger position may be received from the input device 106.

The biometric sensor 108 is a sensor that gathers movement-oriented biometric data. In some embodiments, the biometric sensor 108 is a camera system capable of tracking user gestures. In some embodiments, the biometric sensor 108 is a camera system capable of gathering eye gazing data and/or eye tracking data. Both eye gazing data and eye tracking data are examples of movement-oriented biometric data used to determine where a user's eye are looking.

As used herein, eye gazing data refers to movement-oriented biometric data that tracks eye movement by identifying the orientation of facial features in relation to a computer interface. Eye gazing data provides rough orientation information by using height, neck orientation, nose orientation, and other facial features. However, eye gazing data does not provide the precise location where the eye is looking. In contrast, eye tracking data refers to movement-oriented biometric data that tracks eye movement by identifying eye features, such as pupil location or retina location. Eye tracking data provides precise eye orientation information and is able to more precisely determine where the user is looking.

The user intention analysis device 110 operates on movement-oriented biometric data to interpret user intention from movement. The user intention analysis device 110 may be comprised of computer hardware and/or computer software. For example the user intention analysis device 110 may be circuitry or a processor configured to interpret user intention of a detected movement using the movement-oriented biometric data. In some embodiments, the user intention analysis device 110 comprises software code that allows the processor 102 to interpret user intention from the movement-oriented biometric data. The user intention analysis device 110 is discussed in further detail with reference to FIGS. 2 and 3, below.

The browsing location cue device 112 operates on movement-oriented biometric data to provide a last known browsing location cue. The browsing location cue device 112 may be comprised of computer hardware and/or computer software. For example the browsing location cue device 112 may be circuitry or a processor configured to provide a last known browsing location cue from the movement-oriented biometric data. As another example, the browsing location cue device 112 may comprise software code that allows the processor 102 to provide a last known browsing location cue from the movement-oriented biometric data. The browsing location cue device 112 is discussed in further detail with reference to FIGS. 10 and 11, below.

The memory 114 may be implemented as a computer readable storage medium. In the embodiment shown in FIG. 1, the memory 114 contains stored biometric data 116 and a stored user profile 118. The stored biometric data 116 may be acquired by the input device 106, by the biometric sensor 108, or by the biometric data acquisition device 120. In some embodiments the stored biometric data 116 is limited to a certain number of values. For example, the stored biometric data 116 may consist of the last two seconds worth of movement-oriented biometric data. As another example, the stored biometric data 116 may consist of the latest five-hundred milliseconds of movement-oriented biometric data. In such embodiments, the stored biometric data 116 may be implemented as a ring buffer, circular array, or similar structure where an oldest value is overwritten by newest value once the buffer capacity is reached.

The stored biometric data 116 may comprise time values and one or more of: corresponding position values, corresponding velocity values, corresponding acceleration values, and corresponding jerk (also known as jolt) values. The types of values stored in stored biometric data 116 may depend on the types of data gathered by the input device 106, the biometric sensor 108 and/or the biometric data acquisition device 120. Alternatively, the data gathered by the input device 106, the biometric sensor 108 and/or the biometric data acquisition device 120 may be parsed or augmented to form 116. The user profile 118 comprises user-specific parameters and preferences. The parameters and preferences of the user profile 118 may be defined by a user or by an automated process, e.g., a calibration routine. In some embodiments, a separate profile is stored for each user of the electronic device 101.

The biometric data acquisition device 120 is communicatively coupled to the electronic device 101 and gathers movement-oriented biometric data. The biometric data acquisition device 120 may communicate movement-oriented biometric data with the electronic device 101 via a wired or wireless interface. The external biometric sensor 122 may be similar to the biometric sensor 108 described above. In some embodiments, the biometric data acquisition device 120 is external to, but physically coupled to the electronic device 101. For example, the biometric data acquisition device 120 may be an accessory, including a case or cover, which attaches to the electronic device 101.

Figure 2:
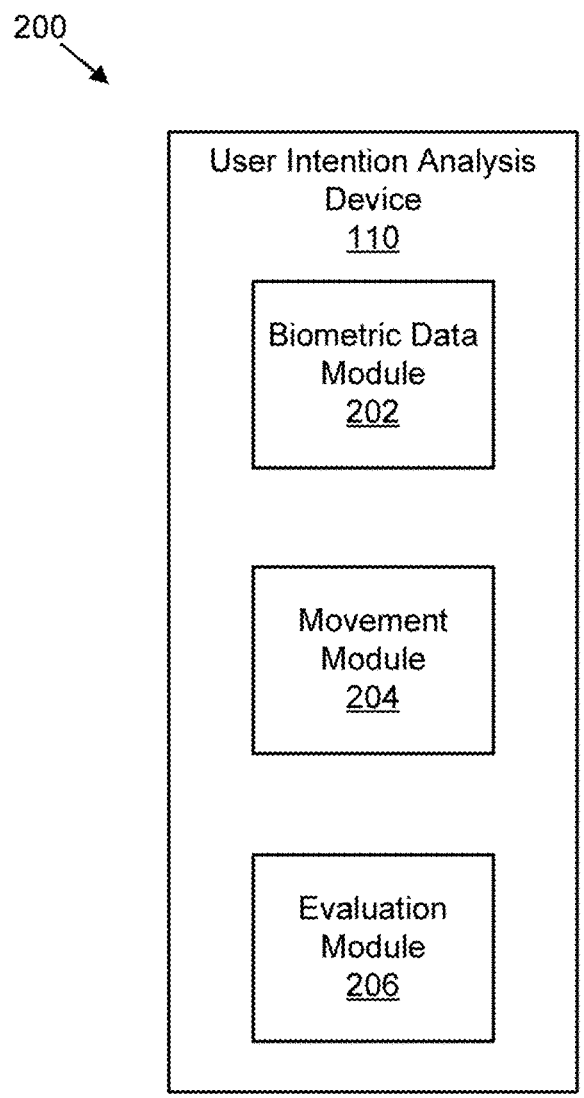
FIG. 2 is a schematic block diagram illustrating one embodiment of an apparatus for real-time detection of user intention based on kinematics analysis of movement-oriented biometric data.

FIG. 2 depicts an apparatus 200 for interpreting user intention based on kinematics analysis of movement-oriented biometric data, according to embodiments of the disclosure. Apparatus 200 comprises a user intention analysis device 110, such as the user intention analysis device 110 described with reference to FIG. 1, above. The user intention analysis device 110 comprises a biometric data module 202, a movement module 204, and an evaluation module 206. The biometric data module 202 receives movement-oriented biometric data, for example from the input device 106, the biometric sensor 108, and/or the memory 114.

In some embodiments the biometric data module 202 identifies the latest biometric data, for example the last N samples of biometric data, where N is a positive integer. The biometric data module 202 may limit the number of biometric data values to a predefined window size, the window size corresponding to a user reaction time. A window size significantly above the user reaction time can improve reliability as it ensures that the detected movement is a conscious movement (i.e., a reaction) and not an artifact or false positive due to noise, involuntary movements, etc.

The movement module 204 determines movement values from the movement-oriented biometric data. In some embodiments, the movement module 204 determines acceleration values from the movement-oriented biometric data. For example, where the biometric data comprises position values and time values, the movement module 204 may derive acceleration values corresponding to the time values. In some embodiments, the movement module 204 determines position, velocity, and/or jerk values from the biometric data. The movement module 204 may include circuitry for calculating integrals and/or derivatives to obtain movement values from the biometric data. For example, the movement module 204 may include circuitry for calculating second-derivatives of location data.

The evaluation module 206 interprets a user intention for a movement based on the movement values determined by the movement module 204. For example, the evaluation module 206 may determine if the user intends to perform a short-range action or a long-range action. In some embodiments, acceleration, velocity, position, and/or jerk values may be compared to a threshold and/or profile to interpret the user intention. For example, the evaluation module 206 may interpret a user's intention to be a distraction movement where an acceleration threshold is exceeded and a jerk threshold is exceeded. As another example, the evaluation module 206 may determine that a user intends to make a short-range movement where velocity values match a bell curve profile. In some embodiments, movement values (i.e., acceleration, velocity, position, and/or jerk values) may be compared to a combination of thresholds and profiles to interpret a user's intention. For example, where velocity values match a bell curve and an acceleration value exceeds a threshold, a user's movement may be interpreted as a long-range movement.

The evaluation module 206 may determine that a user intends to make a short-range (i.e., intra-interface) movement when the velocity value is at (or near) zero and the acceleration value is negative at the edge (or boundary) of the computer interface. On the other hand, the evaluation module 206 may determine that the user intends to make a long-range (i.e., extra-interface) movement when the velocity value is above zero at the edge (or boundary) of the computer interface or when the acceleration value is positive at the edge (or boundary) of the computer interface. The computer interface may be a windowed browser on a laptop, desktop, or tablet computer. As an example, the computer interface may be the entire display of an electronic reader or a handheld device executing a reader application. In the former, the boundaries of the computer interface correspond to the boundaries of the window in question, while in the latter, the boundaries of the computer interface correspond to the boundaries of the display itself.

The evaluation module 206 may determine that a user is reading when a velocity value matches a reading speed profile. The evaluation module 206 may determine user inattention when the velocity value drops below the reading speed profile for a certain amount of time. Additionally, the evaluation module 206 may determine user distraction when the velocity value is above the reading speed and the jerk value exceeds a jerk threshold. Additionally, or alternatively, user distraction may be determined when velocity values match a distraction profile. Profiles and thresholds specific to a user may be stored in the user profile 118.

Figure 3:
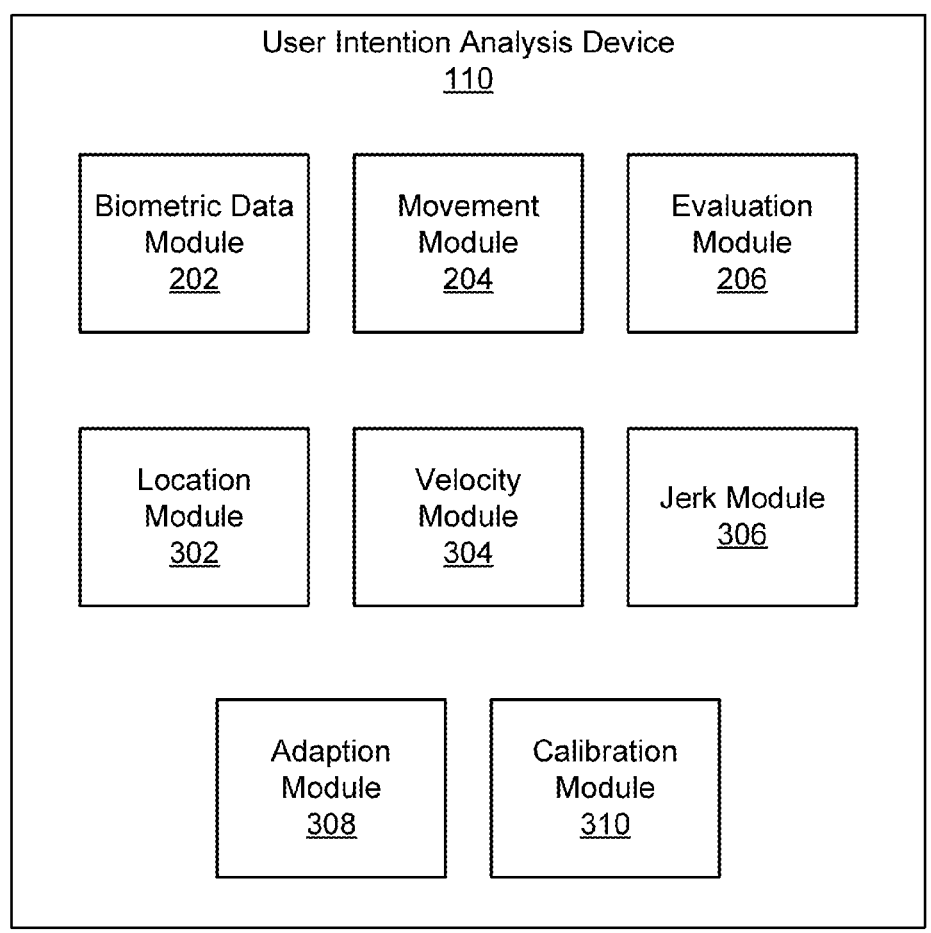
FIG. 3 is a schematic block diagram illustrating another embodiment of an apparatus for real-time detection of user intention based on kinematics analysis of movement-oriented biometric data.

FIG. 3 depicts an apparatus 300 for interpreting user intention based on kinematics analysis of movement-oriented biometric data, according to embodiments of the disclosure. Apparatus 300 comprises a user intention analysis device 110, such as the user intention analysis device 110 described with reference to FIGS. 1 and 2, above. The user intention analysis device 110 contains a biometric data module 202, a movement module 204, and an evaluation module 206, as described with reference to FIG. 2, above. In the embodiments of FIG. 3, the user intention analysis device 110 also includes a location module 302, a velocity module 304, a jerk module 306, an adaptation module 308, and/or a calibration module 310.

The location module 302 identifies location or position values from the movement-oriented biometric data. In some embodiments, the location module 302 may store one or more position thresholds relating to the computer interface. For example, the location module 302 may store position thresholds corresponding to boundaries of the computer interface. As another example, the location module 302 may store position thresholds corresponding to specific regions of the computer interface, such as edges, input fields, and the like. In some embodiments, the stored position thresholds are used by the evaluation module 206 to determine user intention. In some embodiments, the location module 302 itself compares the position values to the position thresholds and outputs the results to the evaluation module 206.

The location module 302 may be an independent module or may be a sub-module of the movement module 204 and/or the evaluation module 206. In some embodiments, the location module 302 may store one or more position profiles used to categorize user movements. For example, the location module 302 may store a position profile corresponding to a short-range movement within the computer interface.

The velocity module 304 identifies velocity or speed values from the movement-oriented biometric data. In some embodiments, the velocity module 304 may store one or more velocity thresholds relating to the computer interface. For example, the velocity module 304 may store velocity thresholds corresponding to boundaries of the computer interface. In some embodiments, the velocity thresholds are general thresholds. In some embodiments, the stored velocity thresholds are used by the evaluation module 206 to determine user intention. In some embodiments, the velocity module 304 itself compares the velocity values to the velocity thresholds and outputs the results to the evaluation module 206.

The velocity module 304 may be an independent module or may be a sub-module of the movement module 204 and/or the evaluation module 206. In some embodiments, the velocity module 304 may store one or more velocity profiles used to categorize user movements. For example, the velocity module 304 may store a velocity profile corresponding to a short-range movement within the computer interface.

The jerk module 306 identifies jerk or jolt values from the movement-oriented biometric data. In some embodiments, the jerk module 306 may store one or more jerk thresholds relating to the computer interface. For example, the jerk module 306 may store jerk thresholds corresponding to specific regions of the computer interface, such as boundaries, edges, and the like. In some embodiments, the jerk thresholds are general thresholds. In some embodiments, the stored jerk thresholds are used by the evaluation module 206 to determine user intention. In some embodiments, the jerk module 306 itself compares the jerk values to the jerk thresholds and outputs the results to the evaluation module 206.

The jerk module 306 may be an independent module or may be a sub-module of the movement module 204 and/or the evaluation module 206. In some embodiments, the jerk module 306 may store one or more jerk profiles used to categorize user movements. For example, the jerk module 306 may store a jerk profile corresponding to a short-range movement within the computer interface.

The adaptation module 308 dynamically adjusts the threshold and/or profiles used by the user intention analysis device 110 responsive to changes in the computer interface. The adaptation module 308 may modify thresholds and/or profiles relating to position, velocity, acceleration, and/or jerk values of the movement-oriented biometric data. In some embodiments, the adaptation module 308 may adjust the thresholds and/or profiles in response to a change in the dimensions of the computer interface. For example, where the computer interface corresponds to a window, changes to the window size may cause the adaptation module 308 to adjust thresholds and/or profiles relating to boundaries or edges of the computer interface. As another example, changes to a window size may also cause the adaptation module 308 to adjust velocity, acceleration, and/or jerk threshold to account for the new dimensions of the window.

In some embodiments, the adaptation module 308 may adjust the thresholds and/or profiles when a distance between the user and the computer interface changes. For example, where the electronic device 101 is a handheld electronic device (e.g., a smartphone or tablet computer) the adaptation module 308 may adjust the thresholds and/or profiles when the user moves the handheld electronic device closer to the user's face. The adjustments may take into account a change in angle between the user and the dimensions of the computer interface as the dimensions of the computer interface appear different to the user even though, pixel-wise, the computer interface dimensions themselves have not changed.

In some embodiments, the calibration module 310 is used to measure a user's performance of a movement and to set initial thresholds and/or profiles used by the evaluation module 206 to interpret the movement-oriented biometric data. Calibration may occur a first time the user intention analysis device 110 is initialized, every time the user intention analysis device 110 is initialized, or it may be manually selected by the user. Calibration may be user-specific and may be stored in the user profile 118. The calibration module 310 allows for more accurate interpretation of movement-oriented biometric data as comparisons may be based on accurate models of user movement. In some embodiments, a user reaction time is calibrated by the calibration module 310. The user reaction time may be used to determine a sample size sufficiently large to distinguish reactive movement and voluntary movements from involuntary movements to as to more accurately interpret user movement.

Figure 4A:
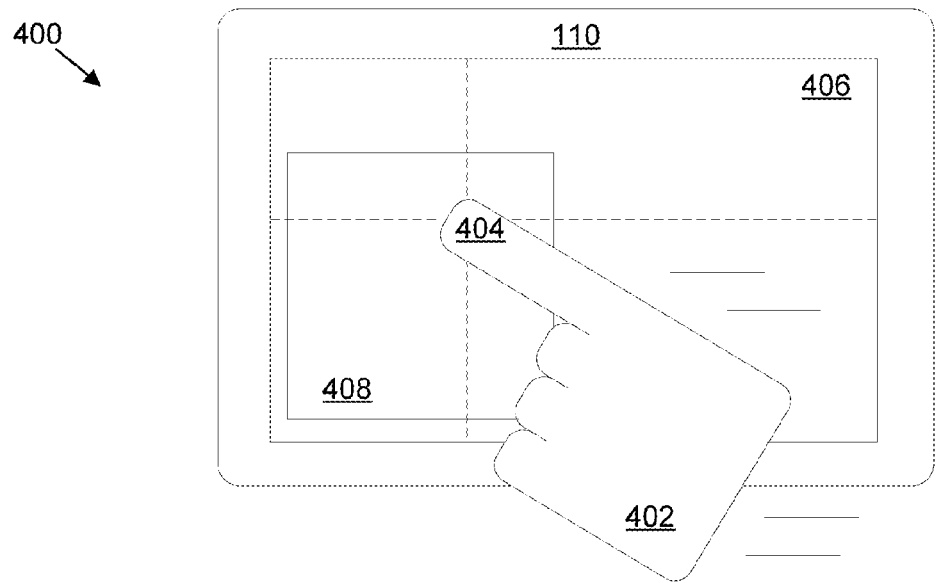
FIG. 4A illustrates one embodiment of real-time detection of user intention based on kinematics analysis of movement-oriented biometric data.
Figure 4B:
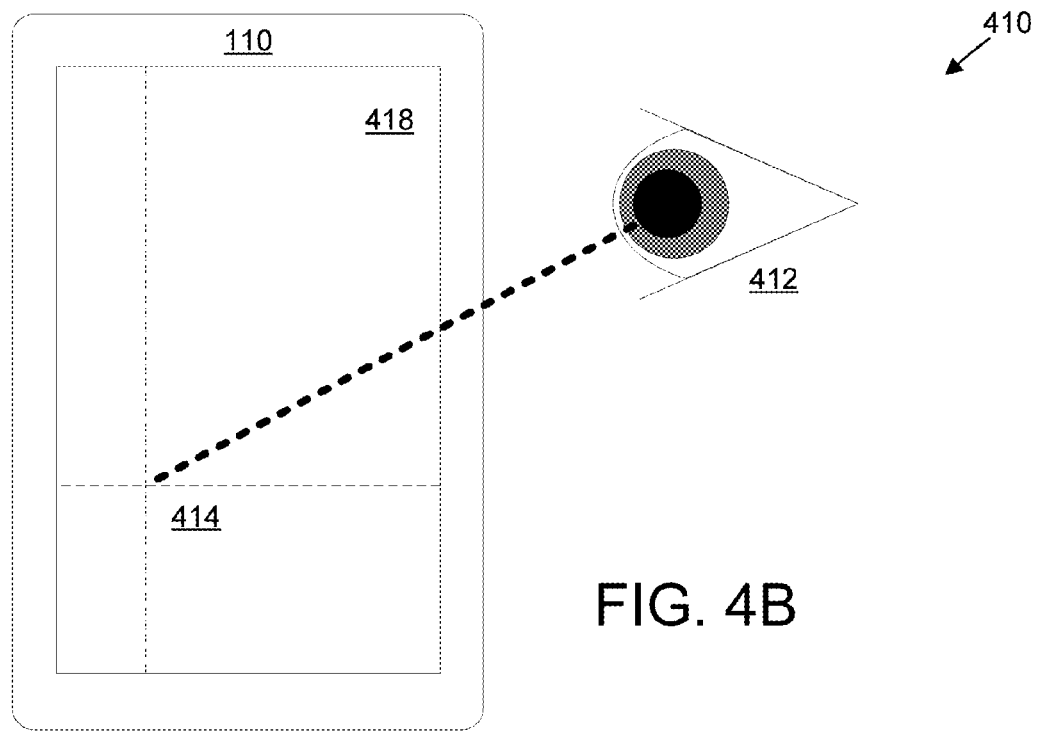
FIG. 4B illustrates another embodiment of real-time detection of user intention based on kinematics analysis of movement-oriented biometric data.

FIGS. 4A and 4B depict embodiments of systems 400 and 410 for interpreting user intention based on kinematics analysis of movement-oriented biometric data. The systems 400 and 410 includes an electronic device 101, such as the electronic device 101 described with reference to FIG. 1, above. In FIG. 4A, the electronic device 101 receives movement-oriented biometric data regarding locations and/or movements of a user's finger(s) 402. The finger(s) 402 may be touching a display of the electronic device 101 or may be gesturing in an area in front the display of the electronic device 101. The browsing location 404 is on the computer interface 408, which may correspond to a window in a display 406. From the movement-oriented biometric data, the electronic device 101 is able to determine a browsing location 404 of the finger 402.

In some embodiments, the movement-oriented biometric data may be used to determine if movement by the user's finger 402 is intended to initiate a short-range movement, for example a short-edge swipe, or a long-range movement, for example a long-edge swipe. The electronic device 101 may interpret the user's intention by comparing the movement-oriented biometric data, including location 404, to one or more thresholds and/or profiles, as discussed with reference to FIGS. 2 and 3, above.

In FIG. 4B, the electronic device 101 receives movement-oriented biometric data regarding locations and/or movements of a user's eye(s) 406. From the movement-oriented biometric data, the electronic device 101 is able to determine a viewing location 414 of the eye 412. The viewing location 414 is on the computer interface 418, which may correspond to an entire display. In some embodiments, the movement-oriented biometric data may be used by the electronic device 101 to determine if movement by the user's eye 412 is intended to initiate a short-range movement, for example a short-edge swipe, or a long-range movement, for example a long-edge swipe. In some embodiments, the movement-oriented biometric data may be used to determine if movement by the user's eye 412 is indicative of the user being distracted from or inattentive to the computer interface 418.

The electronic device 101 may interpret the user's intention by comparing the movement-oriented biometric data, including viewing location 414, to one or more thresholds and/or profiles, as discussed with reference to FIGS. 2 and 3, above.

Figure 5:
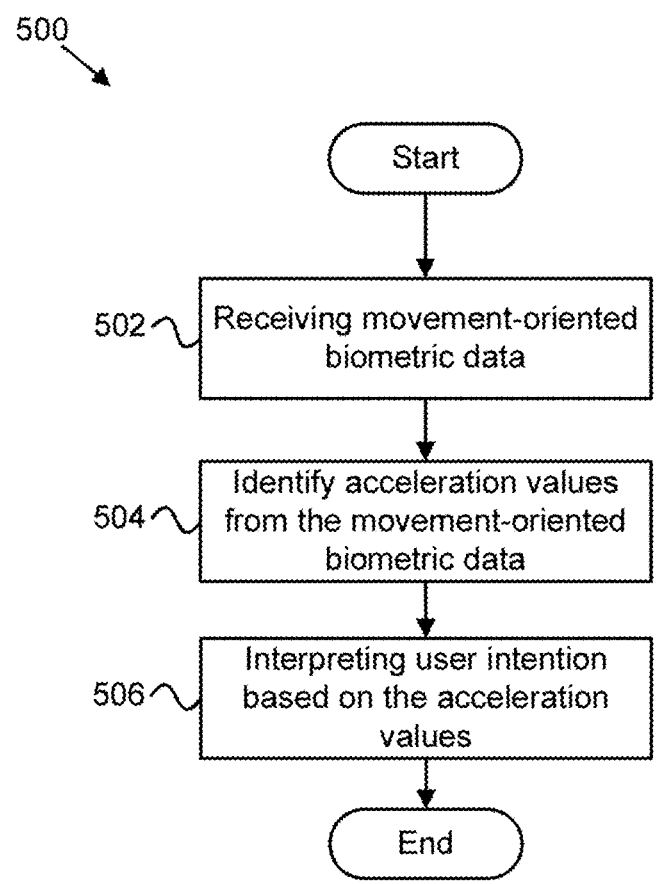
FIG. 5 is a schematic flow chart diagram illustrating one embodiment of a method for real-time detection of user intention based on kinematics analysis of movement-oriented biometric data.

FIG. 5 depicts a method 500 for interpreting user intention based on kinematics analysis of movement-oriented biometric data, according to embodiments of the disclosure. In one embodiment, the method 500 begins by receiving 502 movement-oriented biometric data in an electronic device 101. In certain embodiments, a biometric data module 202 obtains the movement-oriented biometric data from one of the input device 106, the biometric sensor 108, and the biometric data 116. Receiving 502 movement-oriented biometric data may include receiving only the last N samples of biometric data, where N is a positive integer corresponding to a measurement window for biometric data. The measurement window may be user specific and the value of N may be prompted, may be automatically determined, may be retrieved from a user profile 118, and/or may be adjusted depending on the nature of the computer interface.

The method 500 proceeds with identifying 504 acceleration values from the movement-oriented biometric data. The acceleration values may be identified via a movement module 204 of a user intention analysis device 110. In some embodiments, an evaluation module 206 interprets 506 a user intention based on the acceleration values. The user intention may be a short-range movement, a long-range movement, and/or a distraction movement. The user intention may be interpreted 506 through comparing the acceleration values to one or more acceleration thresholds and/or profiles. The thresholds and/or profiles may be specific to the user, to the computer interface, and or to the electronic device 101.

Figure 6:
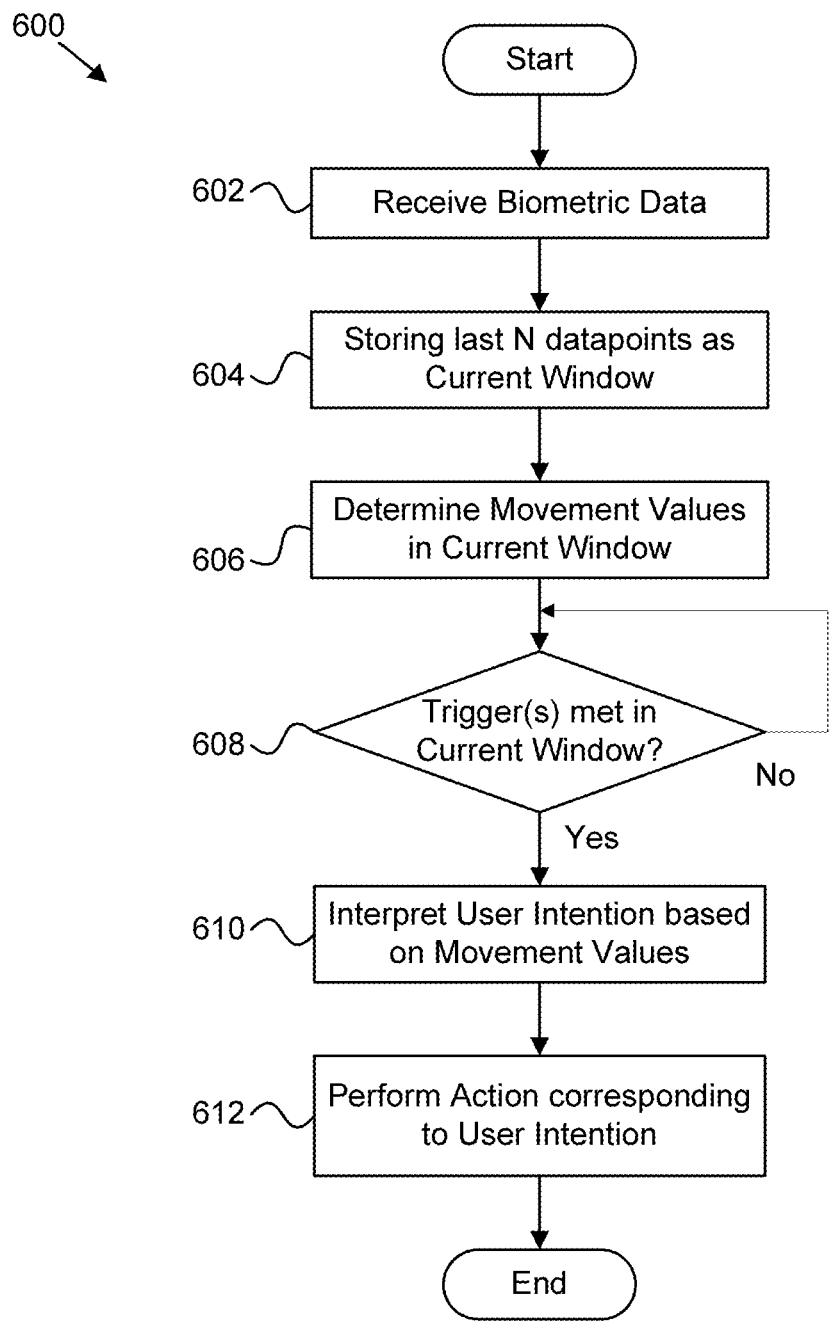
FIG. 6 is a schematic flow chart diagram illustrating another embodiment of a method for real-time detection of user intention based on kinematics analysis of movement-oriented biometric data.

FIG. 6 depicts a method 600 for interpreting user intention based on kinematics analysis of movement-oriented biometric data, according to embodiments of the disclosure. In one embodiment, the method 600 begins by receiving 602 movement-oriented biometric data in an electronic device 101. The method includes storing 604 the last N datapoints as a current window, where N is a positive integer corresponding to a user reaction time. The biometric data is analyzed in determining 606 movement values in the current window. These movement values may be position values, velocity values, acceleration values and/or jerk values for moments in time corresponding to the N datapoints. The movement values may be parsed or calculated from the movement-oriented biometric data, depending on the nature of the biometric data.

The determined movement values may be examined in determining 608 whether one or more triggers have been met in the current window. The triggers may be based on position, pressure, velocity, and/or acceleration and indicate to the user intention analysis device 110 that a movement in need of interpretation has occurred. Additionally, a trigger may be received from another program or module that uses a user intention analysis device 110 to interpret intentions of user movement. One or more triggers may need to be met to result in a positive determination 608.

Once the trigger(s) is met, the movement values of the current window are interpreted 610 to determine a user's intention. In some instances, the movement values indicate a short-range movement. In some instances, the movement values indicate a long rage movement. In some instances, the movement values indicate a distraction or inattention movement. Other movements and/or gestures may be interpreted as known in the art.

In some embodiments, the method 600 continues with performing 612 an action corresponding to the user intention. For example, an action corresponding to a swipe command (i.e., a close action, a menu action, a switching action) may be performed after interpreting the user intention. In some embodiments, a data value is returned to a calling program or stored in memory in response to interpreting the user intention.

Figure 7:
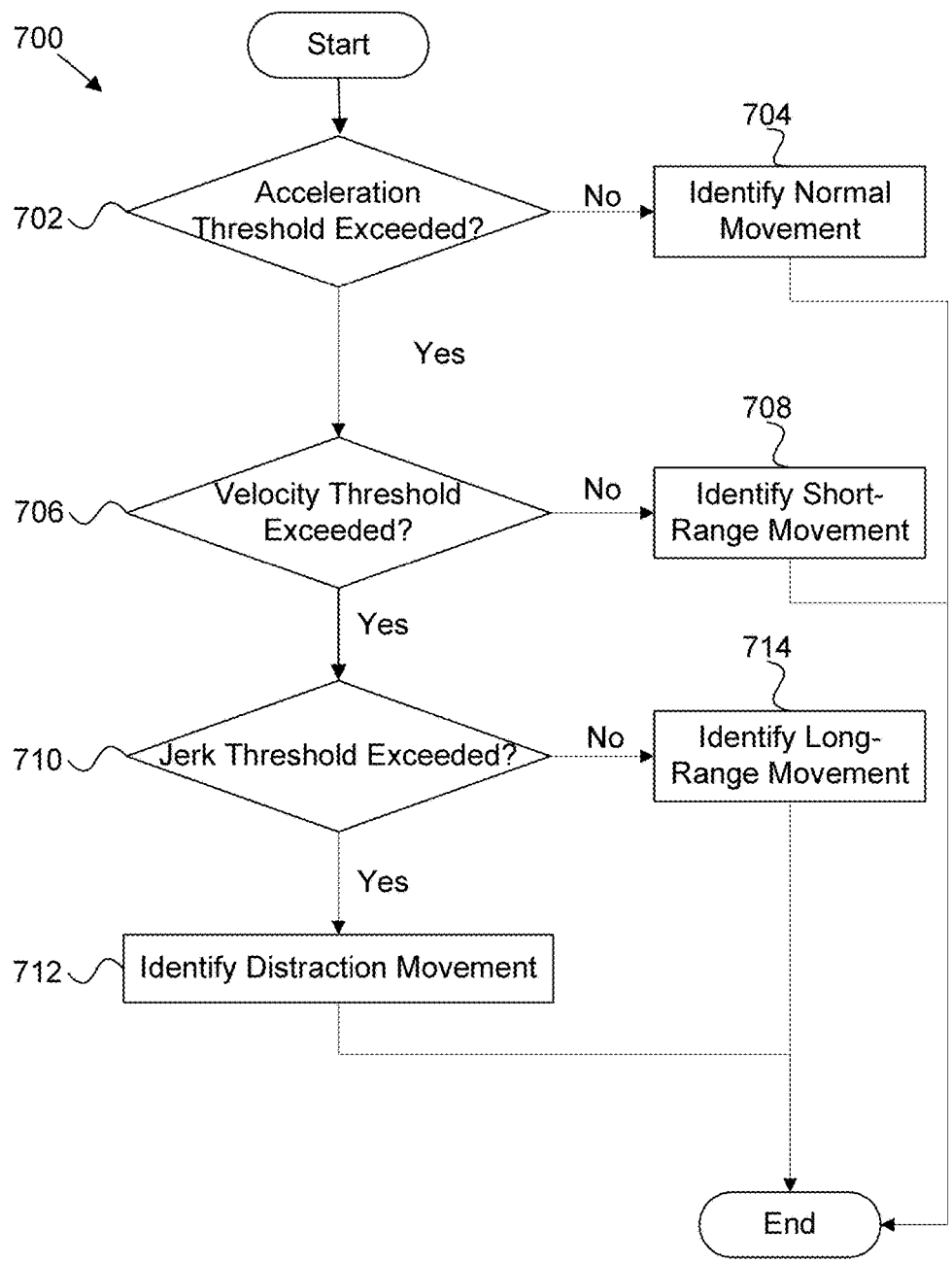
FIG. 7 is a schematic flow chart diagram illustrating one embodiment of a method for interpreting user intention based on movement values.

FIG. 7 depicts a method 700 for interpreting user intention based on movement values, according to embodiments of the disclosure. A movement is identified by comparing movement values to various thresholds. The method includes comparing 702 the movement values to at least one acceleration threshold. If the acceleration threshold is not exceeded, the method then identifies 704 a normal movement and return an indicator of such. If the acceleration threshold is exceeded, the movement values may be compared 706 to at least one velocity threshold.

The method 700 may identify 708 a short-range movement, and return an indicator of such, if the velocity threshold is not exceeded. Otherwise, if the velocity threshold is exceeded, the method continues to 710 where the movement values are compared to at least one jerk threshold. If the jerk threshold is exceeded, the method may identify 712 the movement as a distraction movement and return an indicator of such, otherwise the movement may be identified 714 as a long-range movement and an indicator of such returned. The thresholds may be selected according to the nature of the biometric data (e.g., eye gazing data or figure position data) and according to the results of other comparisons. Additionally, or alternatively, the movement values may be compared to one or more profiles in each of the comparison steps of the method 700.

Figure 8:
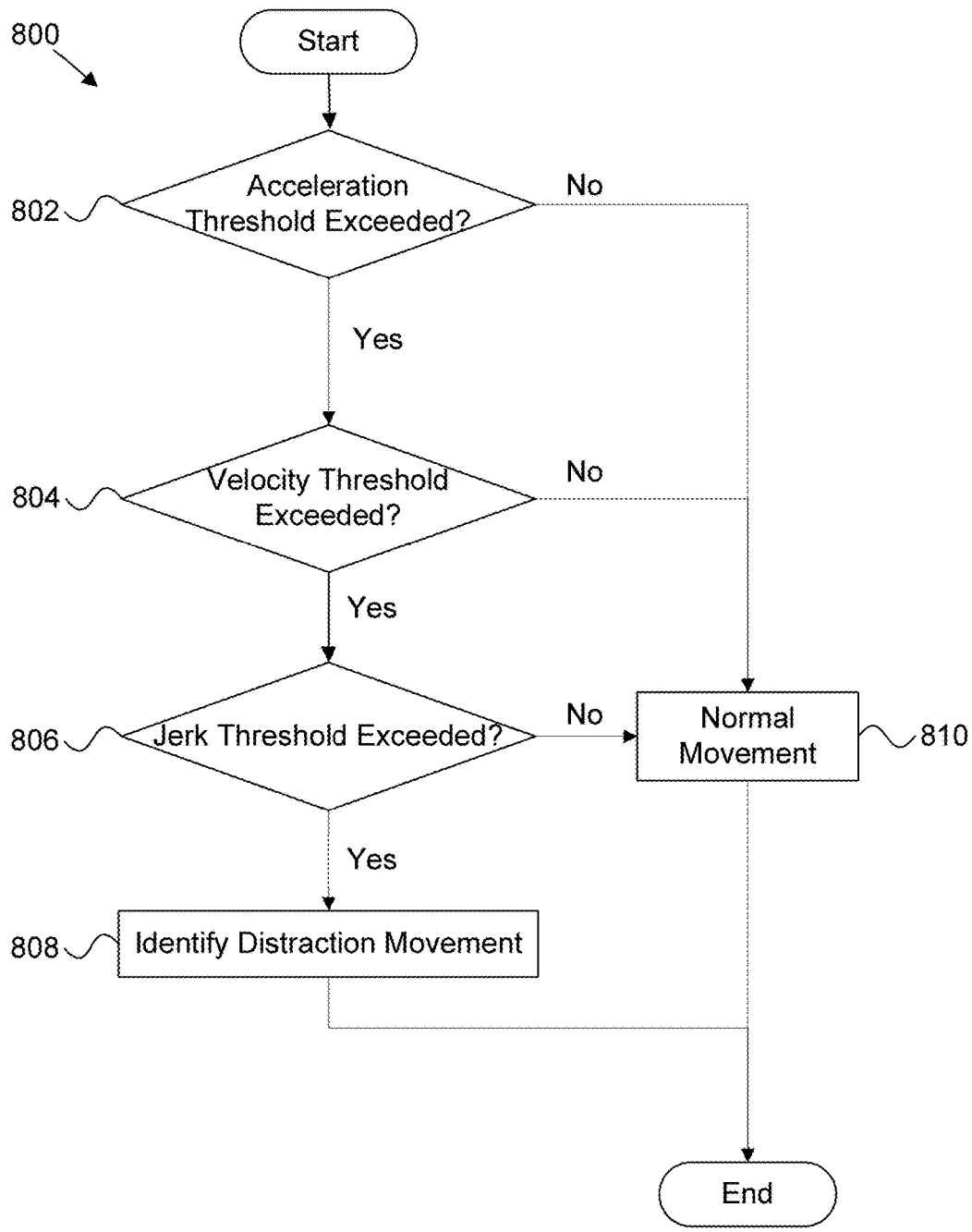
FIG. 8 is a schematic flow chart diagram illustrating one embodiment of a method for determining user distraction based on movement-oriented biometric data.

FIG. 8 depicts a method 800 for determining user distraction based on movement-oriented biometric data, according to embodiments of the disclosure. Movement values obtained from movement-oriented biometric data may be compared 802 to an acceleration threshold using, for example, the evaluation module 206. Next, the movement values may be compared 804 to a velocity threshold using, for example, the evaluation module 206 or the velocity module 304. Next, the movement values may be compared 806 to a jerk threshold using, for example, the evaluation module 206 or the jerk module 306. If the movement values meet all of the thresholds, the method 800 may identify a distraction movement and return an indicator of such.

The method 800 may determine 810 a normal (i.e., attentive) movement, and return an indicator of such, if any of the thresholds is unmet. The thresholds may be selected according to the nature of the biometric data (e.g., eye gazing data or figure position data). Additionally, or alternatively, the movement values may be compared to one or more profiles in each of the comparison steps of the method 800.

Figure 9:
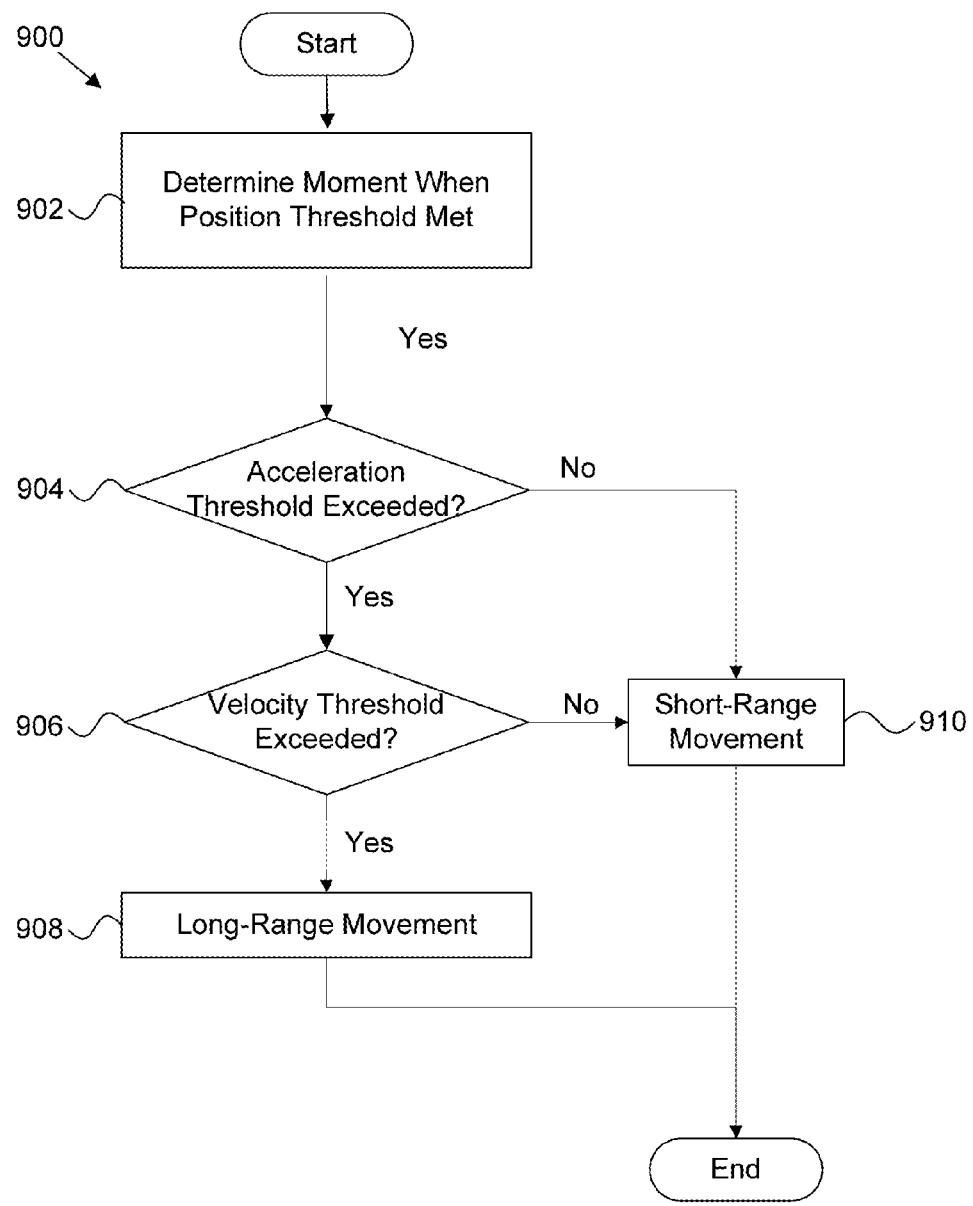
FIG. 9 is a schematic flow chart diagram illustrating one embodiment of a method for distinguishing between short-range and long-range movements based on movement-oriented biometric data.

FIG. 9 depicts a method 900 for distinguishing between short-range and long-range movements based on movement-oriented biometric data, according to embodiments of the disclosure. The method 900 may begin when movement within a computer interface is detected. At 902, movement-oriented biometric data is monitored to determine the moment in time when a position threshold is met. In some embodiments, the position threshold corresponds to a boundary of a computer interface.

At 904, an acceleration value corresponding to the determined moment in time is compared to an acceleration threshold. For example, an acceleration value at the computer interface boundary may be compared to the acceleration threshold. If the acceleration threshold is met, further comparisons are performed, otherwise the movement is identified 910 as a short-range movement. In some embodiments, the acceleration threshold is near zero.

At 906, a velocity value corresponding to the determined moment in time is compared to a velocity threshold. For example, a velocity value at the computer interface boundary may be compared to the velocity threshold. If the velocity threshold is met, the movement is identified 908 as a long-range movement. Otherwise, the movement is identified 910 as a short-range movement.

Figure 10:
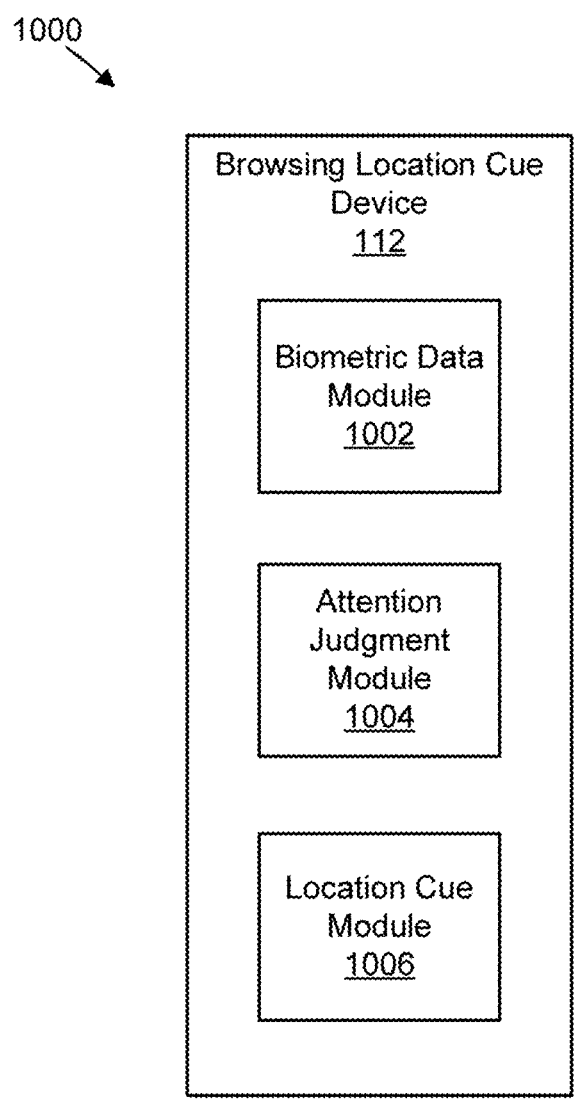
FIG. 10 is a schematic block diagram illustrating one embodiment of an apparatus for providing a last known browsing location cue using movement-oriented biometric data.

FIG. 10 depicts an apparatus 1000 for providing a last known browsing location cue using movement-oriented biometric data, according to embodiments of the disclosure. Apparatus 1000 comprises a browsing location cue device 112, such as the browsing location cue device 112 described with reference to FIG. 1, above. The browsing location cue device 112 comprises a biometric data module 1002, an attention judgment module 1004, and a location cue module 1006.

The biometric data module 1002 receives movement-oriented biometric data, for example from the input device 106, the biometric sensor 108, the memory 114, or the biometric data acquisition device 120. In some embodiments the biometric data module 1002 identifies the latest biometric data, for example the last N samples of biometric data, where N is a positive integer. The biometric data module 1002 may limit the number of biometric data values to a predefined window size, the window size corresponding to a user reaction time. A window size significantly above the user reaction time can improve reliability as it ensures that the detected movement is a conscious movement (i.e., a reaction) and not an artifact or false positive due to noise, involuntary movements, etc. The biometric data module 1002 may be similar to the biometric data module 202 discussed with reference to FIG. 2.

The attention judgment module 1004 detects user distraction based on the biometric data. In some embodiments, the attention judgment module 1004 determines movement values from the biometric data. For example, the attention judgment module 1004 may determine position values, velocity values, acceleration values, jerk values, or other movement-related values from the movement-oriented biometric data. The attention judgment module 1004 may include circuitry for calculating integrals and/or derivatives to obtain movement values from the biometric data. For example, the attention judgment module 1004 may include circuitry for calculating second-derivatives of location data.

In some embodiments, the attention judgment module 1004 receives movement values from another device or module. For example, the attention judgment module 1004 may receive movement values from one or more of the input device 106, the biometric sensor 108, the user intention analysis device 110, the memory 116, the biometric data acquisition device 120, and/or the movement module 204.

In some embodiments, the attention judgment module 1004 analyzes the movement values to detect user distraction. In some embodiments, movement values (i.e., acceleration, velocity, position, and/or jerk values) may be compared to a threshold and/or profile to detect user distraction. For example, the attention judgment module 1004 may interpret a user's intention to be a distraction movement where an acceleration threshold is exceeded and a jerk threshold is exceeded. In some embodiments, movement values may be compared to a combination of thresholds and profiles to interpret a user's intention. In some embodiments, movement values at an edge or boundary of a computer interface may be analyzed to detect user distraction.

The computer interface may be a windowed browser on a laptop, desktop, or tablet computer. As an example, the computer interface may be the entire display of an electronic reader or a handheld device executing a reader application. In some embodiments, the attention judgment module 1004 receives an indication of user distraction from another module or device, such as the evaluation module 206.

In some embodiments, the attention judgment module 1004 may determine that a user is reading when a velocity value matches a reading speed profile. The attention judgment module 1004 may determine user distraction when the velocity value is above the reading speed and the jerk value exceeds a jerk threshold. Additionally, or alternatively, user distraction may be determined when velocity values match a distraction profile. Profiles and thresholds specific to a user may be stored in the user profile 118.

In some embodiments, the attention judgment module 1004 identifies a moment in time when the user is first distracted. The attention judgment module 1004 may store a value representing this moment in the memory 114 or may output this value to another module or device.

The location cue module 1006 provides a visual cue in the computer interface responsive to the attention judgment module 1004 determining that the user has become distracted. The visual cue may be any indicator suitable for indicating a last known browsing location, for example, a highlight, an underline, an icon, or the like. In some embodiments, the last known browsing location corresponds to a location on the computer interface where the user was looking just before becoming distracted. In some embodiments, the location cue module 1006 determines the last known browsing location from the biometric data. In other embodiments, the location cue module 1006 receives the last known browsing location from another module or device.

The location cue module 1006 may provide the visual cue immediately after receiving an indication that the user is distracted, or may present the visual cue in response to receiving additional triggers, such as the expiration of a timer. Additionally, in some embodiments, the location cue module 1006 may remove the visual cue after a predetermined amount of time or in response to receiving another trigger, such as an indication that the user is again attentive to the computer interface.

Figure 11:
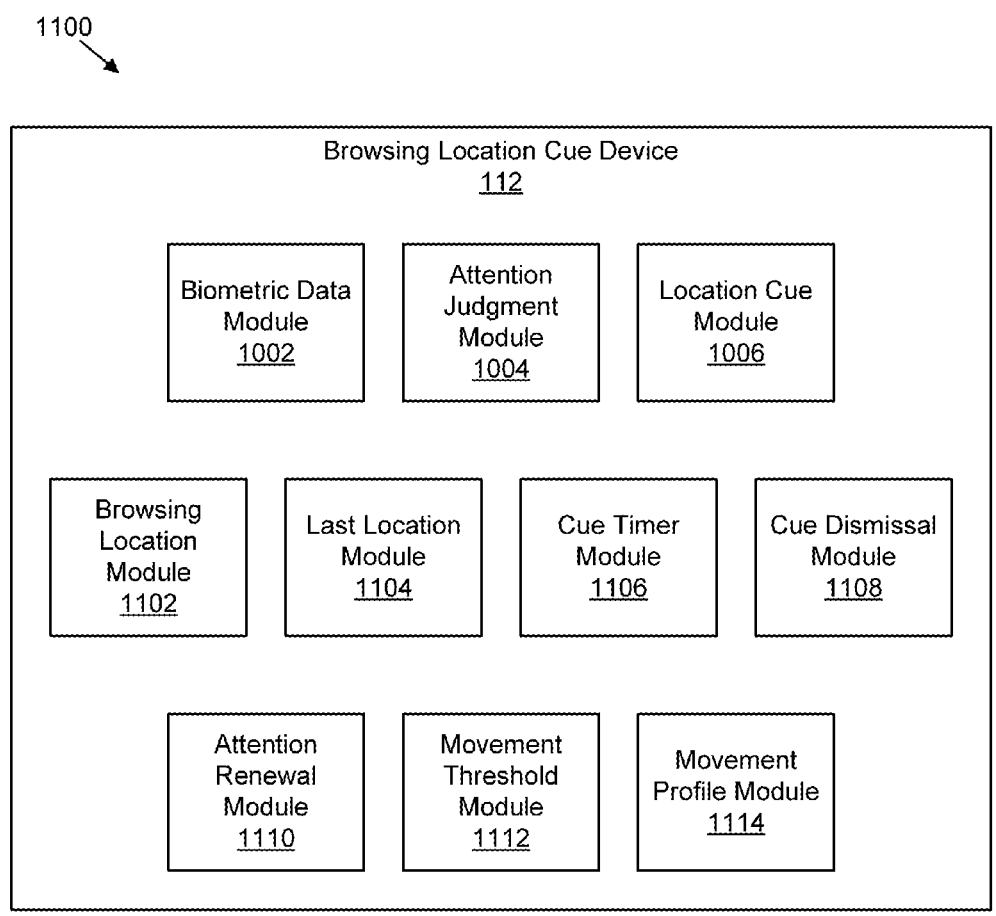
FIG. 11 is a schematic block diagram illustrating another embodiment of an apparatus for providing a last known browsing location cue using movement-oriented biometric data.

FIG. 11 depicts an apparatus 1100 for providing a last known browsing location cue using movement-oriented biometric data, according to embodiments of the disclosure. Apparatus 1100 comprises a browsing location cue device 112, such as the browsing location cue device 112 described with reference to FIGS. 1 and 10, above. The browsing location cue device 112 contains a biometric data module 1002, a judgment module 1004, and a location cue module 1006, as described with reference to FIG. 10, above. In the embodiments of FIG. 11, the browsing location cue device 112 also includes a browsing location module 1102, a last location module 1104, a cue timer module 1106, a cue dismissal module 1108, an attention renewal module 1110, a movement threshold module 1112, and/or a movement profile module 1114.

The browsing location module 1102 identifies a browsing location on a computer interface based on the movement-oriented biometric data. In some embodiments, the browsing location module 1102 identifies position values from the movement-oriented biometric data and correlates the position values to determine a location on the computer interface where the user is looking; the location being a browsing location. In some embodiments, the browsing location module 1102 uses eye tracking or eye gazing algorithms to determine the browsing location.

In some embodiments, the browsing location module 1102 receives a position value determined from the movement-oriented biometric data from another device or module, such as the input device 106, the biometric data sensor 108, the user intention analysis device 110, the memory 116, the biometric data acquisition device 120, the movement module 204, and/or the attention judgment module 1004, and interpolates a browsing location from the position value.

In some embodiments, the browsing location module 1102 stores a number of recent browsing locations. The recent browsing locations may be stored in the memory 114 or in the browsing location module 1102 itself. The number of recent browsing locations may be fixed or variable. In some embodiments, the number of recent browsing locations corresponds to a data window size used by the biometric data module 1002. In some embodiments, the browsing location module 1102 provides the recent browsing locations to the location cue module 1006. In some embodiments, the browsing location module 1102 determines a last known browsing location corresponding to a moment of distraction and provides the last known browsing location to the location cue module 1006.

The last location module 1104 identifies an inattention time corresponding to the detected user distraction. In some embodiments, the last location module 1104 receives an indication of user distraction from the attention judgment module 1004 and identifies a moment in time when the user is first distracted. The last location module 1104 may store a value representing this moment in the memory 114 or may output this value to another module or device, such as the location cue module 1006 or the browsing location module 1102, for use in determining a last known browsing location. In some embodiments, the last location module 1104 sends the inattention time to the location cue module 1006 for use in providing the last known browsing location.

The cue timer module 1106 initiates a marking timer in response to detecting user distraction. The marking timer counts down (or up according to implementation) a predetermined amount of time before sending a signal to another device or module. In some embodiments, the marking timer is adjustable and the amount of time is user specific. For example, a user may specify a marking timer amount. As another example, the cue timer module 1106 may automatically determine a marking timer amount based on data in the user profile 118. Upon expiration, the cue timer module 1106 sends a signal to the location cue module 1006 indicating that the visual cue should be displayed.

The cue dismissal module 1108 initiates a removal timer in response to detecting user distraction. The removal timer counts down (or up according to implementation) a predetermined amount of time before sending a signal to another device or module. In some embodiments, the removal timer is adjustable and the amount of time is user specific. For example, a user may specify a removal timer amount. As another example, the cue dismissal module 1108 may automatically determine a removal timer amount based on data in the user profile 118. In some embodiments, the cue dismissal module 1108 removes the visual cue in response to expiration of the removal timer. In other embodiments, the cue dismissal module 1108 sends a signal to the location cue module 1006 upon expiration of the removal timer indicating that the visual cue should be removed.

The attention renewal module 1110 detects whether user attention is returned to the computer interface subsequent to the user distraction. In some embodiments, the attention renewal module 1110 operates on the movement-oriented biometric data to determine that the user is again paying attention to the computer interface. In some embodiments, movement values (i.e., acceleration, velocity, position, and/or jerk values) may be compared to a threshold and/or profile to detect user attention. For example, the attention renewal module 1110 may determine that a user is attentive to the computer interface when a velocity value matches a reading speed profile. As another example, the attention renewal module 1110 may determine that a user is attentive to the computer interface when acceleration values are below a velocity threshold for a window of time and a browsing location corresponds to a location within the computer interface.

Upon detecting that the user's attention has returned to the computer interface, the attention renewal module 1110 signals the location cue module 1006 indicating that the visual cue should be provided. In some embodiments, the attention renewal module 1110 receives an indication of user attention from another device or module, such as the evaluation module 206, the movement threshold module 1112, or the movement profile module 1114, and signals the location cue module 1006 that the visual cue should be provided.

The movement threshold module 1112 compares the movement-oriented biometric data to at least one threshold to determine whether the user is attentive to the computer interface. The threshold may be a position threshold, a velocity threshold, an acceleration threshold, and/or a jerk threshold. For example, the movement threshold module 1112 may determine that a user is attentive to the computer interface when acceleration values are below a velocity threshold for a window of time and a browsing location corresponds to a location within the computer interface. In some embodiments, the movement threshold module 1112 operates in conjunction with the judgment module 1004 to determine whether a user is distracted. In some embodiment, the movement threshold module 1112 operates in conjunction with the location cue module 1006 to determine when to provide the visual cue.

The movement profile module 1114 compares the movement-oriented biometric data to at least one profile to determine whether the user is attentive to the computer interface. The profile may be an eye speed profile, an eye acceleration profile, and/or an eye jolt profile. For example, the movement profile module 1114 may determine that a user is attentive to the computer interface when a velocity value matches a reading speed profile. In some embodiments, the movement profile module 1114 operates in conjunction with the judgment module 1004 to determine whether a user is distracted. In some embodiment, the movement profile module 1114 operates in conjunction with the location cue module 1006 to determine when to provide the visual cue.

FIGS. 12A-12D depict a system 1200 for providing a last known browsing location cue using movement-oriented biometric data, according to embodiments of the disclosure. The system 1200 comprises an electronic device 101 that is viewed by a user 1202. The electronic device 101 includes a computer interface 1206. In some embodiments, the computer interface 1206 may be a display, a window, or any sub-element of a display or window. The nature of the computer interface 1206 may depend on the type of electronic device 101 and the nature of applications being executed on the electronic device 101.

Figure 12A:
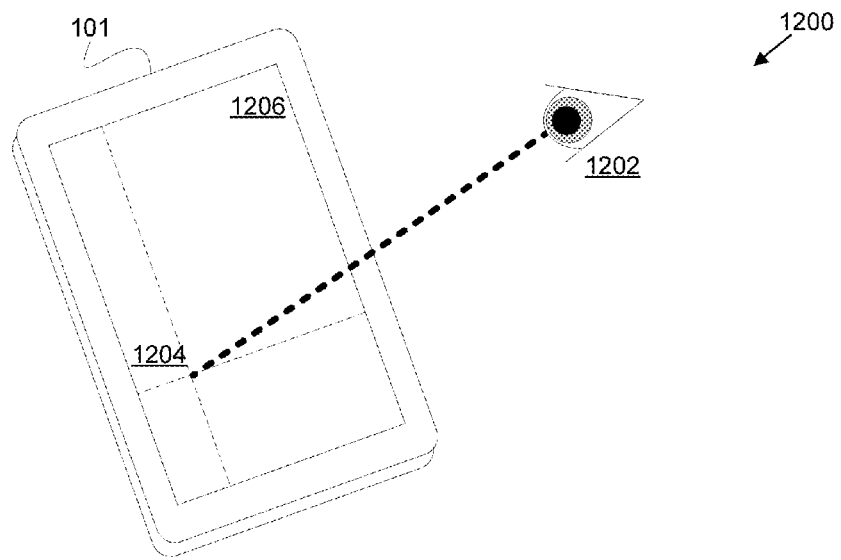
FIG. 12A illustrates one embodiment of providing a last known browsing location cue using movement-oriented biometric data.

In FIG. 12A, the user 1202 is viewing the computer interface 1206. The electronic device 101 receives movement-oriented biometric data regarding locations and/or movements of a user's eyes 1202. From the movement-oriented biometric data, the electronic device 101 is able to determine a browsing location 1204 of the eyes. The viewing location 1204 is on the computer interface 1206, which is depicted as corresponding to an entire display.

Figure 12B:
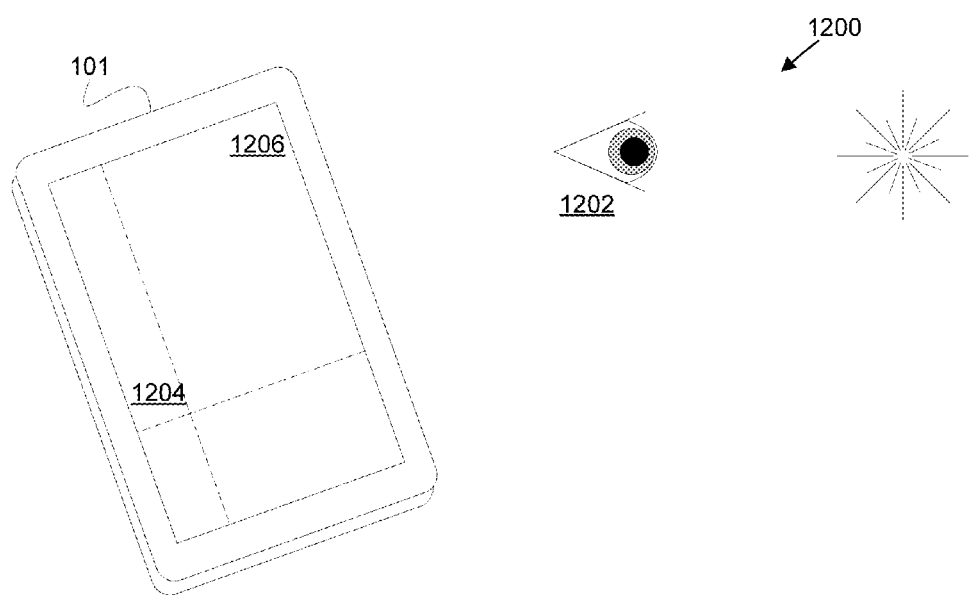
FIG. 12B illustrates another view of providing a last known browsing location cue using movement-oriented biometric data according to the embodiment of FIG. 12A.
Figure 12C:
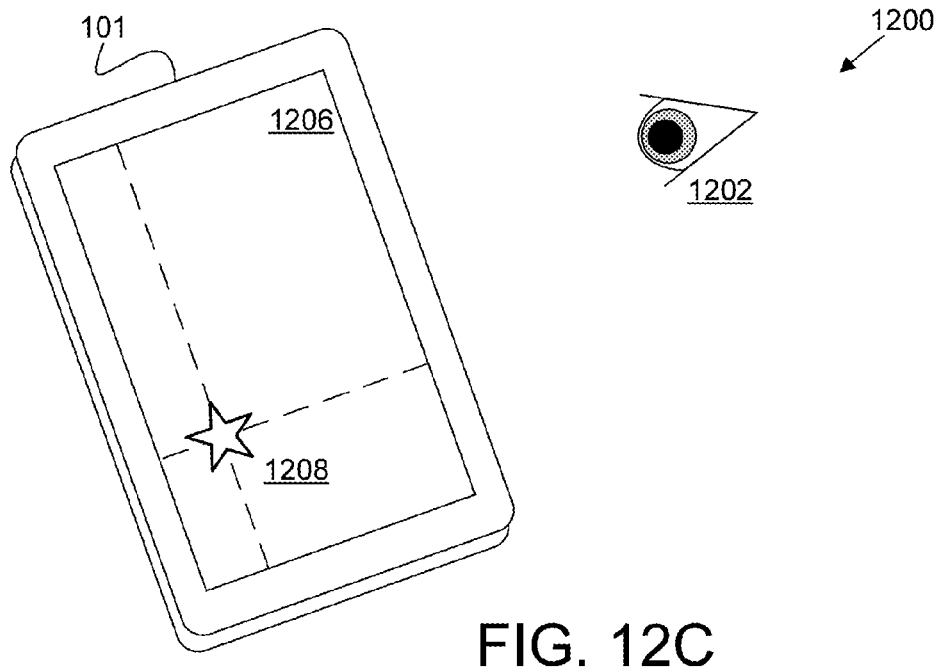
FIG. 12C illustrates another view of providing a last known browsing location cue using movement-oriented biometric data according to the embodiment of FIG. 12A.

In FIG. 12B, the user 1202 becomes distracted and in no longer viewing the computer interface 1206. The electronic device 101 receives movement-oriented biometric data regarding movement of the user's eyes 1202 away from the computer interface 1206. The electronic device 101 may determine the user 1202 distraction by identifying movement values from the movement-oriented biometric data and comparing the movement values to thresholds and/or profiles, as discussed above with reference to FIGS. 2, 3, and 5-8. In some embodiments, the user intention analysis device 110 determines user distraction and signals the judgment module 1004. In some embodiments, one of the 1112 and 1114 determines user distraction and signals the judgment module 1004. In some embodiments, the judgment module 1004 determines user distraction. Upon determining user distraction, the last browsing location 1204 prior to the distraction is identified In FIG. 12C, the last browsing location 1204 prior to the distraction is identified and a visual cue 1208 is presented to the user 1202. In some embodiments, the visual cue is provided in response to expiration of a timer. In some embodiments, the visual cue is provided in response to detecting that the user is once again looking at the computer interface 1206.

The visual cue 1208 may be any indicator suitable for indicating the last known browsing location. For example, the visual cue 1208 may be a highlight (e.g., highlighted text), an underline, a foreground mark, a background mark (e.g., a watermark), an icon, and the like. In some embodiments, the visual cue 1208 comprises animated text or color-differentiated text (i.e., text of a different color). In some embodiments, the visual cue 1208 may comprise bold or bright colors that attract the eye. In some embodiments, the visual cue is provided by fading text, images, or other display data except in the area surrounding the last known browsing location. For example, a word located at a last known browsing position and one or more nearby context words may be displayed in black lettering while all other words in the computer interface may be displayed in lighter shades of gray. As another example, a sentence located at a last known browsing position may be displayed in black lettering while all other words in the computer interface may be displayed in lighter shades.

In some embodiments, a trace may be provided that underlines or highlights words or locations on the computer interface 1206 corresponding to a current browsing location 1204 and fades to transparency with time or with progress (e.g., a word at the current browsing location is underlined with 0% transparency while the previous M words are underlines with increasing amounts of transparency). When user distraction is detected, the trace stops fading so that the underline or highlight indicates the last known browsing location.

Figure 12D:
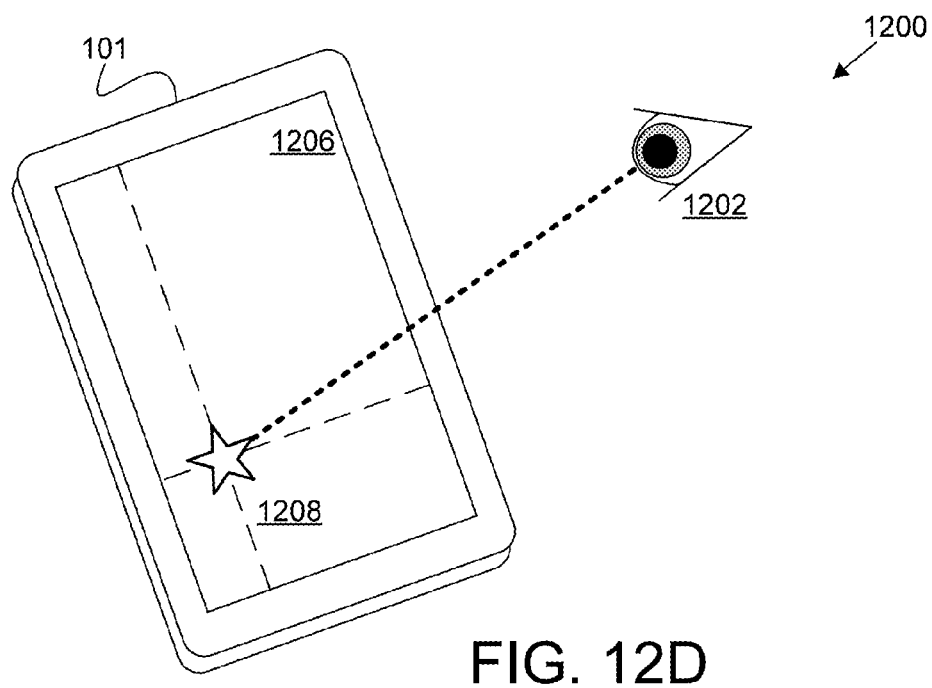
FIG. 12D illustrates another view of providing a last known browsing location cue using movement-oriented biometric data according to the embodiment of FIG. 12A.

In FIG. 12D, the user 1202 visually acquires the visual cue 1208 and easily identifies the last known browsing location. The user 1202 is able to quickly resume viewing (e.g., reading) the computer interface 1206. The visual cue 1208 is removed in response to the electronic device 101 identifying that the user 1202 is paying attention to the computer interface 1206. In some embodiments, the visual cue 1208 is removed in response to expiration of a timer, where the timer was initiated in response to the user 1202 paying attention to the computer interface 1206. In some embodiments, the visual cue 1208 is removed in response to the electronic device 101 determining, from the movement-oriented biometric data, that the user 1202 has resumed normal activity, for example reading at a normal speed.

Figure 13:
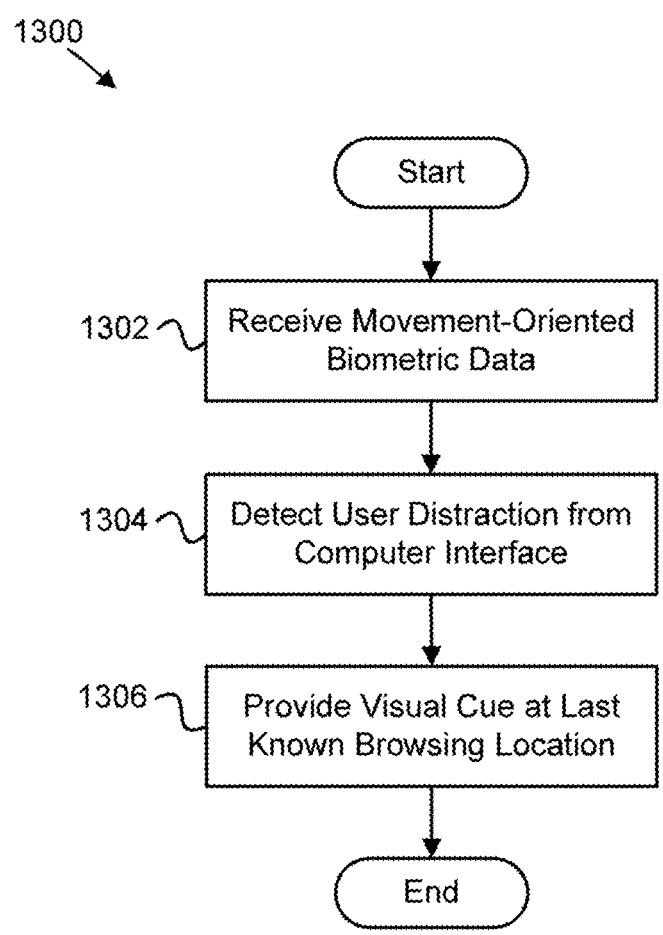
FIG. 13 is a schematic flow chart diagram illustrating one embodiment of a method for providing a last known browsing location cue using movement-oriented biometric data.

FIG. 13 depicts a method 1300 for providing a last known browsing location cue using movement-oriented biometric data, according to embodiments of the disclosure. The method 1300 comprises receiving 1302 movement-oriented biometric data. In certain embodiments, a biometric data module 1002 obtains the movement-oriented biometric data, for example from one of the input device 106, the biometric sensor 108, the 122, and the stored biometric data 116.

Receiving 1302 movement-oriented biometric data may include receiving only the last N samples of biometric data, where N is a positive integer corresponding to a measurement window for biometric data. The measurement window may be user specific and the value of N may be prompted, may be automatically determined, may be retrieved from a user profile 118, and/or may be adjusted depending on the nature of the computer interface. In some embodiments, the movement-oriented biometric data is received in real-time and comprises a plurality of viewing position values and a plurality of timestamps, each timestamp corresponding to one of the plurality of viewing positions. In some embodiments, the movement-oriented biometric data is eye gazing data. In some embodiments, the movement-oriented biometric data is eye tracking data.

The method 1300 proceeds with detecting 1304 user distraction from a computer interface based on the movement-oriented biometric data. In some embodiments, movement values are identified via a judgment module 1004 of a browsing location cue device 112. The movement values may be compared to various thresholds and/or profiles to detect that a user has become distracted. In some embodiments, step 1304 comprises identifying a moment in time when the user is first distracted.

The method continues with providing 1306 a visual cue in the computer interface indicating a last known browsing location. The visual cue may be any indicator suitable for indicating a last known browsing location. The last known browsing location is a location on the computer interface where the user was looking just before becoming distracted. In some embodiments, the last known browsing location is determined from the biometric data. In other embodiments, the last known browsing location is received from another module or device. The visual cue may be presented immediately after detecting 1304 that the user is distracted, or may be presented in response to receiving additional triggers, such as the expiration of a timer. Additionally, in some embodiments, the visual cue may be removed after a predetermined amount of time or in response to receiving an indication that the user is again attentive to the computer interface.

Figure 14:
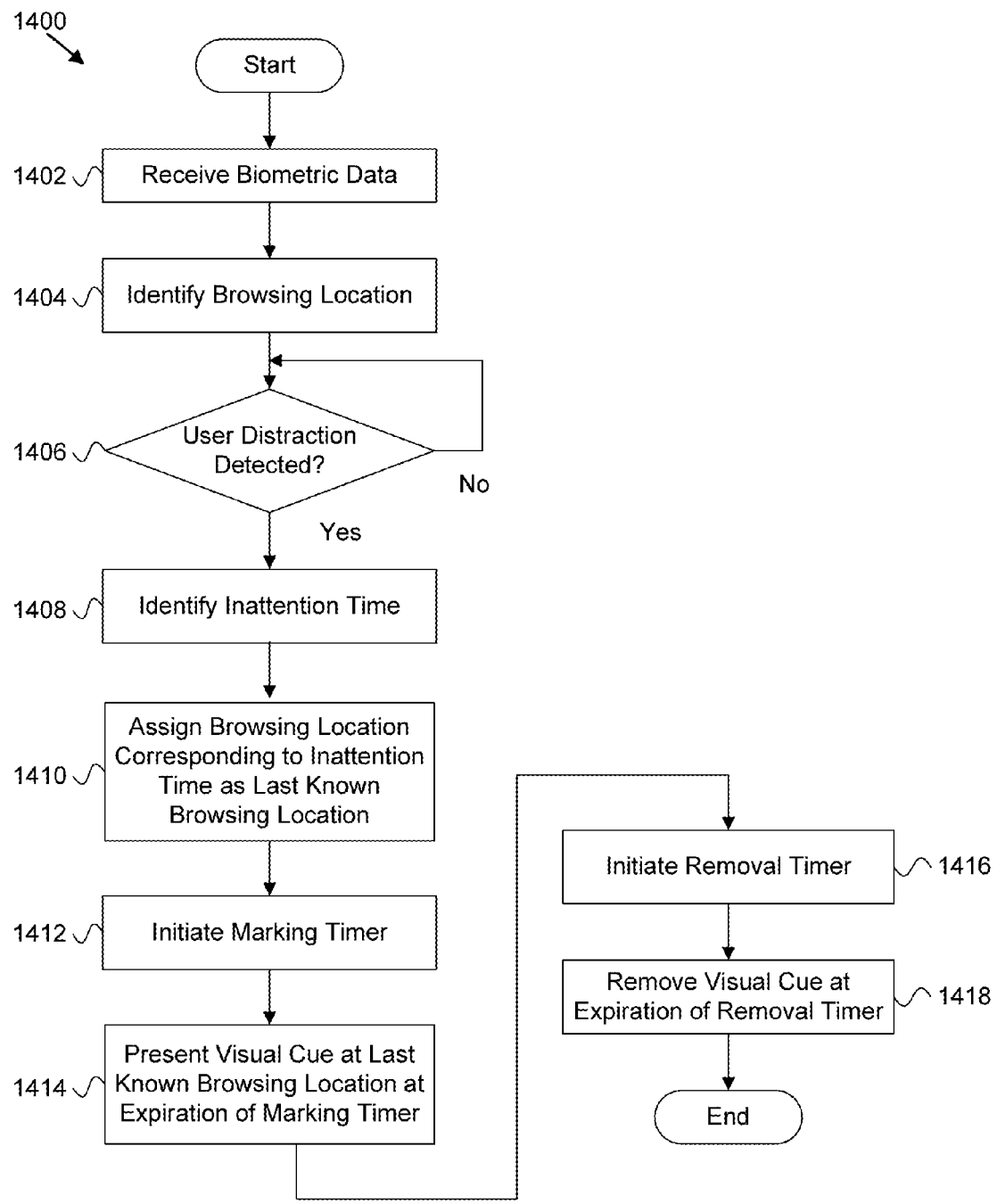
FIG. 14 is a schematic flow chart diagram illustrating another embodiment of a method for providing a last known browsing location cue using movement-oriented biometric data.

FIG. 14 depicts a method 1400 for providing a last known browsing location cue using movement-oriented biometric data, according to embodiments of the disclosure. The method 1400 comprises receiving 1402 movement-oriented biometric data, for example from the input device 106, the biometric sensor 108, the biometric data acquisition device 120, and/or the stored biometric data 116. The movement-oriented biometric data is used to identify 1404 a browsing location. In some embodiments, a plurality of browsing locations are identified corresponding to most recent location on the computer interface where the user has looked.

In some embodiments, step 1402 comprises identifying position values from the movement-oriented biometric data and correlating the position values to locations on the computer interface to determine where the user is looking. In some embodiments, step 1402 comprises using eye tracking or eye gazing algorithms to determine the browsing location. In some embodiments, step 1402 comprises receiving a position value from another device or module, such as the input device 106, the biometric sensor 108, the user intention analysis device 110, the stored biometric data 116, the biometric data acquisition device 120, the movement module 204 and/or the attention judgment module 1004, and interpolating a browsing location from the position value.

Step 1406 involves determining whether user distraction has been detected. User distraction may be detected by comparing the biometric data to thresholds and/or profiles as discussed above. If user distraction is not detected, the method 1400 loops and step 1406 repeats. If user distraction is detected, an inattention time is identified 1408 corresponding to the detected user distraction. The inattention time is used to identify and assign 1410 a browsing location as the last known browsing location.

Step 1412 involves initiating a marking timer. The marking timer counts down a predetermined amount of time. The marking timer may be adjustable and may be user specific. Upon expiration of the marking timer, a visual cue is presented 1414 at the last known browsing location.

Step 1416 involves initiating a removal timer. In some embodiments, the removal timer is initiated upon detecting that the user is again attentive to the user interface. In some embodiments, the removal timer is initiated responsive to providing the visual cue. Upon expiration of the removal timer, the visual cue is removed 1418 from the computer interface.

Figure 15:
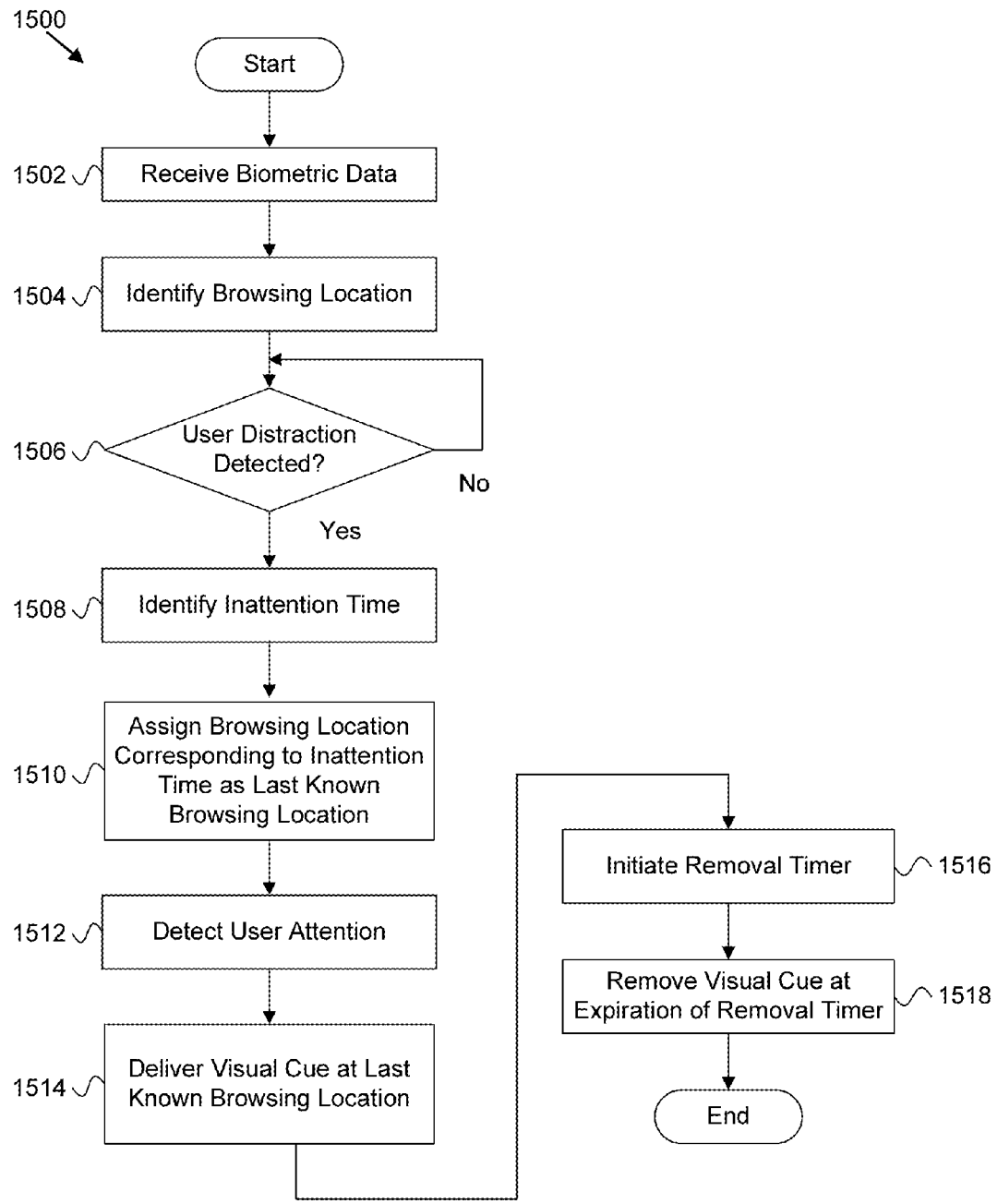
FIG. 15 is a schematic flow chart diagram illustrating another embodiment of a method for providing a last known browsing location cue using movement-oriented biometric data.

FIG. 15 depicts a method 1500 for providing a last known browsing location cue using movement-oriented biometric data, according to embodiments of the disclosure. The method 1500 comprises receiving 1502 movement-oriented biometric data, for example from the input device 106, the biometric sensor 108, the biometric data acquisition device 120, and/or the biometric data 116. The movement-oriented biometric data is used to identify 1504 a browsing location. In some embodiments, a plurality of browsing locations are identified corresponding to most recent location on the computer interface where the user has looked.

In some embodiments, step 1502 comprises identifying position values from the movement-oriented biometric data and correlating the position values to locations on the computer interface to determine where the user is looking. In some embodiments, step 1502 comprises using eye tracking or eye gazing algorithms to determine the browsing location. In some embodiments, step 1502 comprises receiving a position value from another device or module, such as the input device 106, the biometric sensor 108, the user intention analysis device 110, the stored biometric data 116, the biometric data acquisition device 120, the movement module 204 and/or the attention judgment module 1004, and interpolating a browsing location from the position value.

Step 1506 involves determining whether user distraction has been detected. User distraction may be detected by comparing the biometric data to thresholds and/or profiles as discussed above. If user distraction is not detected, the method 1500 loops and step 1506 repeats. If user distraction is detected, an inattention time is identified 1508 corresponding to the detected user distraction. The inattention time is used to identify and assign 1510 a browsing location as the last known browsing location.

Step 1512 involves detecting user attention. The movement-oriented biometric data may be analyzed to detect that the user is again attentive to the computer display. In some embodiments, the analysis involves comparing the movement-oriented biometric data to thresholds and/or profiles as discussed above. Upon detecting user attention, a visual cue is presented 1514 at the last known browsing location.

Step 1516 involves initiating a removal timer. In some embodiments, the removal timer is initiated responsive to detecting that the user is again attentive to the user interface. In some embodiments, the removal timer is initiated responsive to providing the visual cue. Upon expiration of the removal timer, the visual cue is removed 1518 from the computer interface.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving movement-oriented biometric data;
   determining, with a processor, an acceleration value at a time corresponding to a position threshold being exceeded using the movement-oriented biometric data;
   identifying a velocity value corresponding to the acceleration value; and
   interpreting a user intention based on whether the acceleration value exceeds an acceleration threshold and whether the velocity value exceeds a velocity threshold, wherein interpreting the user intention comprises interpreting the user intention to be an extra-interface movement in response to the acceleration value corresponding to the position threshold being above the acceleration threshold.

2. The method of claim 1, further comprising:
   identifying a position value using the movement-oriented biometric data; wherein interpreting the user intention is also based on the position value exceeding a position threshold corresponding to a boundary of a computer interface.

3. The method of claim 2, wherein interpreting user intention comprises determining an inattention movement in response to the position value exceeding the position threshold by a predetermined amount.

4. The method of claim 1, wherein interpreting user intention comprises:
   interpreting the user intention to be an intra-interface movement in response to the acceleration value being below the acceleration threshold and the velocity value being zero.

5. The method of claim 1, further comprising adjusting a threshold selected from the group consisting of a position threshold and an acceleration threshold in response to a change selected from the group consisting of a user-to-interface distance and a computer interface dimension.

6. The method of claim 1, further comprising:
   identifying a jerk value using the movement-oriented biometric data;
   interpreting the user intention to be an inattention movement in response to the acceleration values being positive and below an acceleration threshold for a predetermined period of time and in response to the jerk value exceeding the jerk threshold during the predetermined period of time.

7. The method of claim 6, further comprising identifying a human reaction time for a user, wherein the predetermined period of time is greater than the human reaction time.

8. The method of claim 7, further comprising measuring a user reaction time value based on the calibration routine, wherein the user reaction time value is identified as the human reaction time.

9. The method of claim 1, wherein the movement-oriented biometric data comprises a plurality of position values and a plurality of timestamps, each timestamp of the plurality of timestamps corresponding to one of the plurality of position values.

10. The method of claim 1, wherein the movement-oriented biometric data is selected from the group consisting of eye tracking data, eye gazing data, and finger position data.

11. An apparatus comprising:
    a processor;
    a memory that stores code executable by the processor to:
    receive movement-oriented biometric data;
    identify an acceleration value at a time corresponding to a position threshold being exceeded using the movement-oriented biometric data;
    identify a velocity value corresponding to the acceleration value; and
    interpret a user intention based on whether the acceleration value exceeds an acceleration threshold and whether the velocity value exceeds a velocity threshold, wherein interpreting the user intention comprises interpreting the user intention to be an intra-interface movement in response to the acceleration value being below the acceleration threshold and the velocity value being zero at the time corresponding to a position threshold being exceeded.

12. The apparatus of claim 11, wherein the processor further identifies position values using the movement-oriented biometric data, wherein the code interprets the user intention based at least in part on whether the position values exceed a position threshold corresponding to a boundary of a computer interface.

13. The apparatus of claim 12, wherein the processor determines an inattention movement in response to the position value exceeding the position threshold by a predetermined amount during a predetermined time period.

14. The apparatus of claim 11, wherein the processor determines an extra-interface movement in response the acceleration value being above the acceleration threshold at the time corresponding to a position threshold being exceeded.

15. The apparatus of claim 11, wherein the processor further adjusts a threshold selected from the group consisting of the acceleration threshold and the position threshold responsive to a change in dimensions of a computer interface.

16. The apparatus of claim 11, wherein the processor further identifies a jerk value using the movement-oriented biometric data, wherein the code determines user attention in response to the acceleration value being positive and below an acceleration threshold for a predetermined period of time and determines user distraction in response to the jerk value exceeding a jerk threshold during the predetermined period of time.

17. A program product comprising a non-transitory computer readable storage medium storing code executable by a processor to perform:
    receiving movement-oriented biometric data;

identifying an acceleration value at a time corresponding to a position threshold being exceeded using the movement-oriented biometric data;

identifying a velocity value corresponding to the acceleration value; and interpreting a user intention based on whether the acceleration value exceeds an acceleration threshold and whether the velocity value exceeds a velocity threshold, wherein interpreting the user intention comprises interpreting the user intention to be an extra-interface movement in response to the acceleration value corresponding to the position threshold being above the acceleration threshold.

18. The program product of claim 17, wherein the code further performs:

identifying a position value using the movement-oriented biometric data, wherein interpreting the user intention is also based on the position value exceeding a position threshold corresponding to a boundary of a computer interface.

19. The program product of claim 17, wherein the code further performs:

determining an intra-interface movement in response to the acceleration value being below the acceleration threshold and the velocity value being zero at a time corresponding to a position threshold being exceeded.

20. The program product of claim 17, wherein the code further performs:

identifying a jerk value using the movement-oriented biometric data;

interpreting the user intention to be an inattention movement in response to the acceleration value being positive and below an acceleration threshold for a predetermined period of time and in response to the jerk value exceeding the jerk threshold during the predetermined period of time.

* * * * *